(12) United States Patent
Kim et al.

(10) Patent No.: US 11,177,681 B2
(45) Date of Patent: Nov. 16, 2021

(54) ELECTRONIC DEVICE AND METHOD FOR CONTROLLING RECHARGE OF BATTERY

(71) Applicant: SAMSUNG ELECTRONICS CO., LTD., Suwon-si (KR)

(72) Inventors: Kyoungwon Kim, Suwon-si (KR); Yusu Kim, Suwon-si (KR); Kisun Lee, Suwon-si (KR); Minjung Park, Suwon-si (KR); Seho Park, Suwon-si (KR); Hangseok Choi, Suwon-si (KR); Yongsang Yun, Suwon-si (KR); Chihyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 16/663,733

(22) Filed: Oct. 25, 2019

(65) Prior Publication Data

US 2020/0136421 A1 Apr. 30, 2020

(30) Foreign Application Priority Data

Oct. 26, 2018 (KR) .......................... 10-2018-0129294

(51) Int. Cl.
*H02J 50/80* (2016.01)
*H02J 7/02* (2016.01)
*H02J 50/12* (2016.01)

(52) U.S. Cl.
CPC .............. *H02J 7/025* (2013.01); *H02J 50/12* (2016.02); *H02J 50/80* (2016.02)

(58) Field of Classification Search
CPC .. H02J 7/025; H02J 50/80; H02J 50/12; H02J 7/342
See application file for complete search history.

(56) References Cited

U.S. PATENT DOCUMENTS 9,847,666 B2 12/2017 Alves et al.
2012/0155133 A1 6/2012 Kim et al.
(Continued)

FOREIGN PATENT DOCUMENTS

KR 10-2013-0036691 4/2013
KR 10-2017-0077587 7/2017
WO 2017/075251 5/2017

OTHER PUBLICATIONS

International Search Report and Written Opinion dated Feb. 11, 2020 in counterpart International Patent Application No. PCT/KR2019/014199.

*Primary Examiner* — Nghia M Doan
(74) *Attorney, Agent, or Firm* — Nixon & Vanderhye, P.C.

(57) ABSTRACT

An electronic device according to various embodiments may include: a coil configured to receive a signal for wirelessly obtaining power from an external electronic device; a wireless power circuit (MFC) configured to output the signal received by the coil as a DC signal; a first capacitive voltage divider circuit configured to adjust the voltage of, and to output, power according to a first voltage division ratio; a second capacitive voltage divider circuit configured to adjust the voltage of, and to output, power according to a second voltage division ratio; a controller configured to control the electronic device to provide the DC signal to at least one capacitive voltage divider circuit among the first capacitive voltage divider circuit and the second capacitive voltage divider circuit, based on a voltage value of the signal received through the coil; and a battery configured to receive another signal output from the at least one capacitive voltage divider circuit, based on the provided DC signal, thereby obtaining power.

20 Claims, 12 Drawing Sheets

(56) References Cited

U.S. PATENT DOCUMENTS

| | | | |
|---|---|---|---|
| 2014/0104898 A1* | 4/2014 | Yeo | H02J 50/12 363/37 |
| 2015/0061604 A1 | 3/2015 | Chuang et al. | |
| 2015/0171932 A1 | 6/2015 | Khandelwal et al. | |
| 2016/0268834 A1* | 9/2016 | Satyamoorthy | H01F 38/14 |
| 2018/0131235 A1 | 5/2018 | Inoue et al. | |
| 2019/0379230 A1* | 12/2019 | Wu | H02J 7/06 |

* cited by examiner

ELECTRONIC DEVICE AND METHOD FOR CONTROLLING RECHARGE OF BATTERY

CROSS-REFERENCE TO RELATED APPLICATION

This application is based on and claims priority under 35 U.S.C. 119 to Korean Patent Application No. 10-2018-0129294, filed on Oct. 26, 2018, in the Korean Intellectual Property Office, the disclosure of which is incorporated by reference herein in its entirety.

BACKGROUND

1) Field

The disclosure relates to an electronic device for controlling charging of a battery and an operation method thereof.

2) Description of Related Art

The electronic device may receive power from an external electronic device using wired and wireless interfaces. Such an electronic device may include a power management integrated circuit (PMIC) for supplying power received from an external device to a battery.

An electronic device charges the battery by supplying an external power signal to the battery through a power management integrated circuit. The power management integrated circuit adjusts the voltage and current of an external power signal and determines a power supply path such that a power signal having a voltage and current suitable for the battery is supplied to the battery. The adjustment of the voltage and/or the current of the external power signal, which is performed in the power management integrated circuit of the electronic device, may cause power loss.

The above information is presented as background information only to assist with an understanding of the disclosure. No determination has been made, and no assertion is made, as to whether any of the above might be applicable as prior art with regard to the disclosure.

SUMMARY

Embodiments of the disclosure may not be limited to the above mentioned technical subjects, and other technical subjects which are not mentioned may be clearly understood, through the following descriptions, by those skilled in the art.

An electronic device according to various example embodiments may include: a coil configured to receive a signal for wirelessly obtaining power from an external electronic device; a wireless power circuit (MFC) configured to output the signal received by the coil as a DC signal; a first capacitive voltage divider circuit configured to adjust the voltage of, and to output, power according to a first voltage division ratio; a second capacitive voltage divider circuit configured to adjust the voltage of, and to output, power according to a second voltage division ratio; a controller configured to control the electronic device to provide the DC signal to at least one capacitive voltage divider circuit among the first capacitive voltage divider circuit and the second capacitive voltage divider circuit, based on a voltage value of the signal received through the coil; and a battery configured to receive another signal output from the at least one capacitive voltage divider circuit, based on the provided DC signal, thereby obtaining power.

An electronic device according to various example embodiments may include: a coil configured to transmit and receive a signal for wirelessly obtaining power from and providing power to an external electronic device; a rectifier circuit configured to output the signal received by the coil as a DC signal; a wireless charging circuit configured to output the signal for wirelessly obtaining power received by the coil from the external electronic device as a DC signal; a capacitive voltage divider circuit electrically connected to the wireless charging circuit and the battery and configured to adjust the voltage of, and to output, a signal according to a voltage division ratio; a power management integrated circuit electrically connected to the wireless charging circuit and the battery and configured to adjust the voltage of, and to output, a signal, based on power output information in the battery; a controller operatively connected to the wireless charging circuit, the capacitive voltage divider circuit, and the power management integrated circuit and configured to control the electronic device to provide the DC signal to at least one circuit of the capacitive voltage divider circuit and the power management integrated circuit (PMIC), based on a voltage value of the signal received through the coil; and a battery configured to receive another signal output from the at least one circuit based on the provided DC signal.

An electronic device according to various example embodiments may minimize and/or reduce the loss of power supplied from an external electronic device, thereby charging the battery.

An electronic device according to various example embodiments and a method thereof may include an additional circuit for adjusting a voltage and/or a current of an external power signal, thereby reducing power loss.

Effects which can be acquired by the disclosure are not limited to the above described effects, and other effects that have not been mentioned may be clearly understood by those skilled in the art from the following description.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
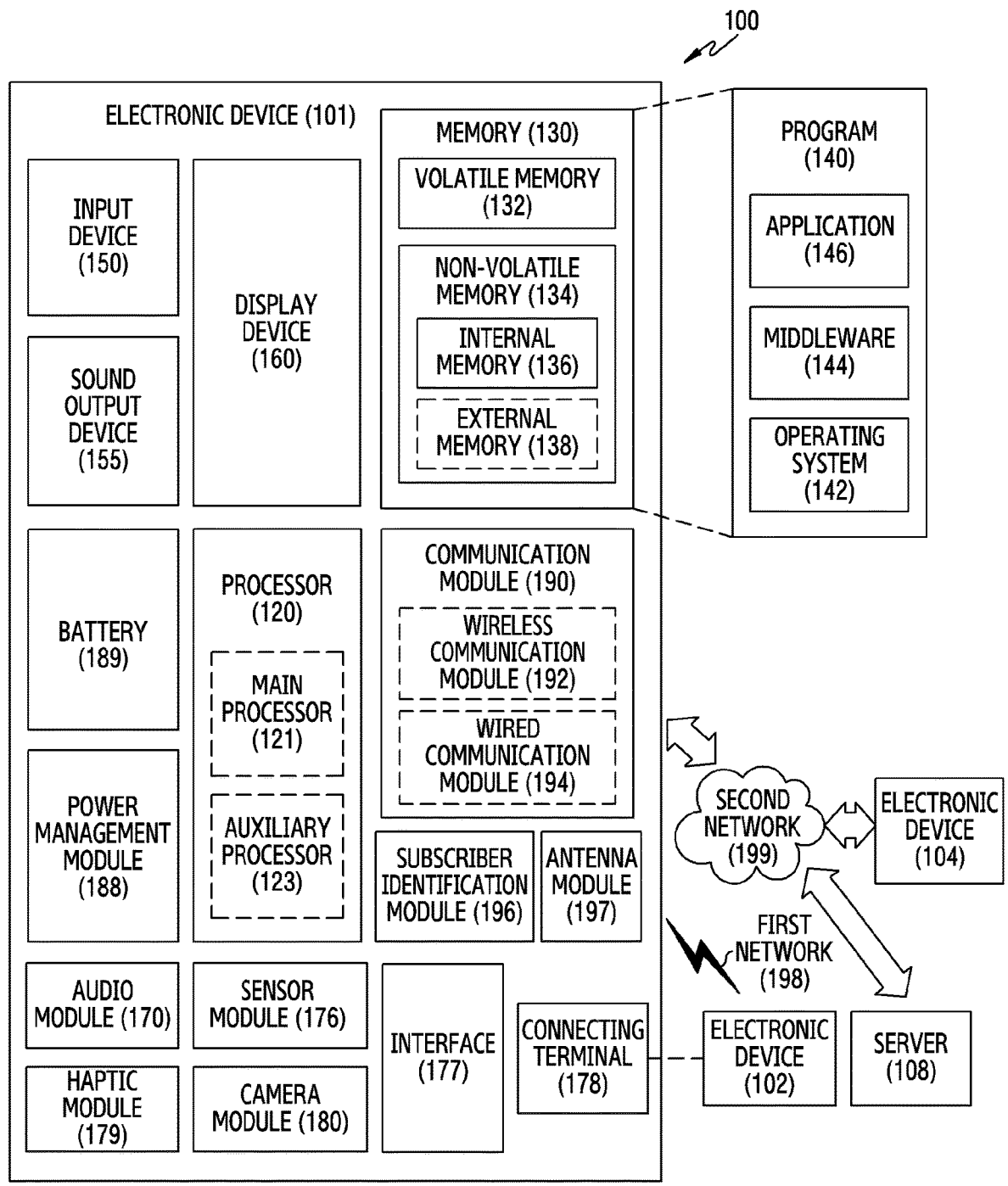
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
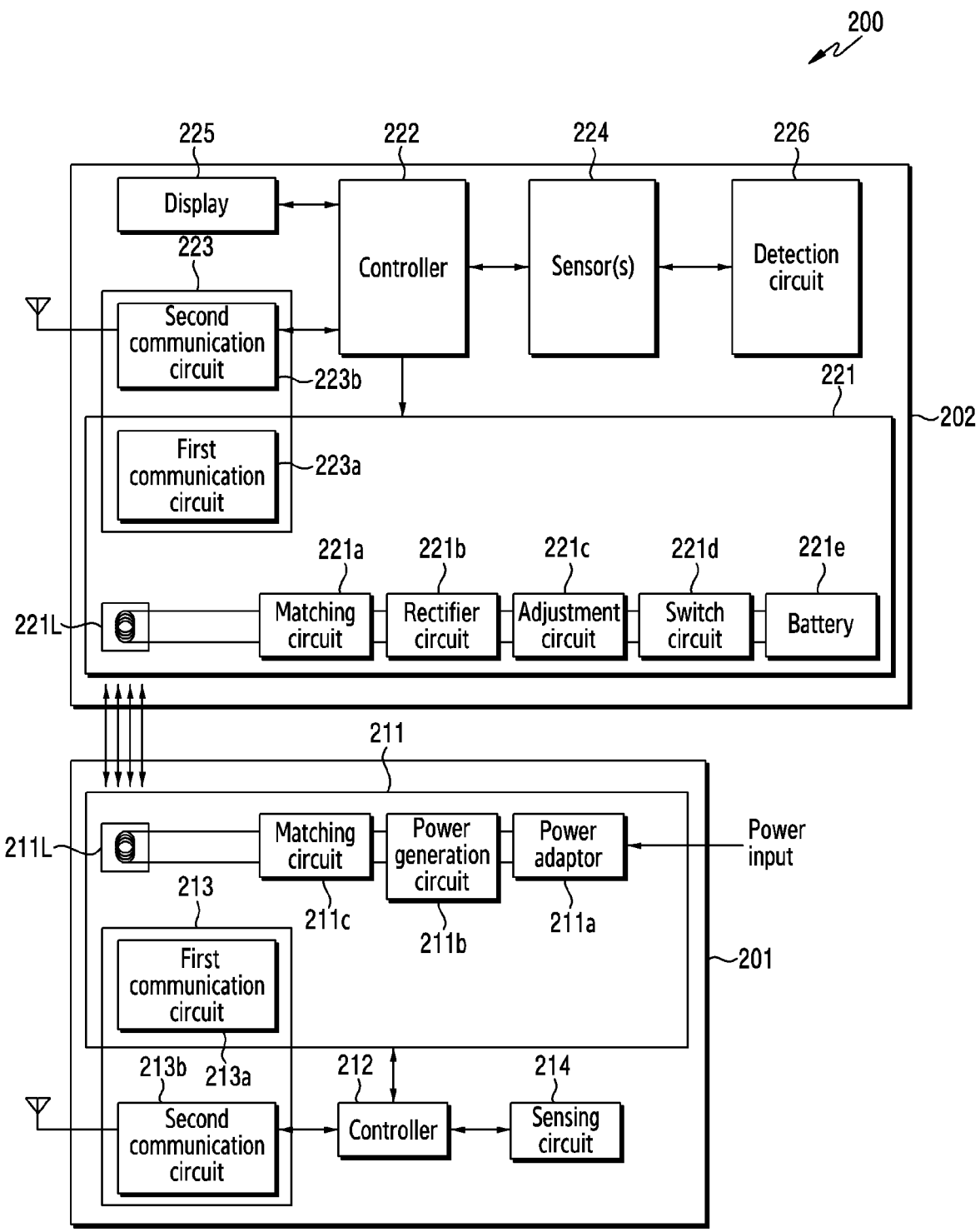
FIG. 2 is a diagram illustrating an example functional configuration of an electronic device according to various embodiments.

FIG. 2 is a diagram illustrating an example configuration of an electronic device in a wireless charging environment 200 according to various embodiments. Referring to FIG. 2, an electronic device 201 (e.g., the electronic device 101 in FIG. 1) (hereinafter, also referred to as a "power transmitting device") according to various embodiments may wirelessly supply power to an external electronic device 202 (e.g., the electronic device 102 in FIG. 1) (hereinafter, also referred to as a "power receiving device"), and the external electronic device 202 may wirelessly receive power. The electronic device 201 may operate in a power transmission mode. The external electronic device 202 may operate in a power reception mode.

According to various embodiments, the power transmitting device 201 may include a power transmission circuit 211, a controller (e.g., including processing circuitry) 212, a communication circuit 213, and/or a sensing circuit 214.

According to various embodiments, the power transmission circuit 211 may include a power adapter (e.g., including power adapting circuitry) 211a for receiving power from an external power source and for appropriately converting the voltage of the input power, a power generation circuit 211b or generating power, and a matching circuit 211c for maximizing and/or improving the efficiency between the transmission coil 211L and the reception coil 221L.

According to various embodiments, the power transmission circuit 211 may include at least some of a plurality of power adapters 211a, a plurality of power generation circuits 211b, a plurality of transmission coils 211L, and a plurality of the matching circuits 211c so as to transmit power to a plurality of power receiving devices (e.g., a first external electronic device and a second external electronic device).

According to various embodiments, the power transmission circuit 211 may supply battery power or external power, which is supplied to the power adapter 211a, to the power generation circuit 211b using the power adapter 211a. According to various embodiments, the battery power may, for example, be a signal for obtaining power input from a battery (not shown) of the electronic device 201 to the power adapter 211a. According to various embodiments, the external power may, for example, be a signal for obtaining power input from another external electronic device (e.g., a travel adapter, a power supply, or the like) to the power adapter 211a.

According to various embodiments, the power transmission circuit 211 may generate a signal for supplying power to the external electronic device 202 using the power generation circuit 211b, and the signal may be transmitted or provided to the transmission coil 221L.

According to various embodiments, the power transmission circuit 211 may generate a first signal having a first frequency for providing a first power to a first external electronic device and a second signal having a second frequency for providing a second power to a second electronic device using the power generation circuit 211b. The first signal having the first frequency and the second signal having the second frequency may be generated in the case where the transmission coil 211L has, for example, a multi-coil structure.

According to various embodiments, the controller 212 may include various processing circuitry and perform overall control of the power transmitting device 201, and may produce various messages required for wireless power transmission, thereby transmitting the same to the communication circuit 213. In an embodiment, the controller 212 may calculate the power (or the amount of power) to be transmitted to the power receiving device 202, based on information received from the communication circuit 213. In an embodiment, the controller 212 may control the power transmission circuit 211 such that the power generated by the transmission coil 211L is transmitted to the power receiving device 202.

According to various embodiments, in the case of transmitting power to respective ones of a plurality of power receiving devices (e.g., a first external electronic device and a second external electronic device), the controller 212 may control the power generation circuit 211b so as to produce a first signal having a first frequency for supplying a first power to the first external electronic device and a second signal having a second frequency for supplying a second power to the second external electronic device. To this end, the transmission coil 211L may have a multi-coil structure.

According to various embodiments, the communication circuit 213 may include at least one of a first communication circuit 213a and/or a second communication circuit 213b. The first communication circuit 213a may communicate with a first communication circuit 223a of the power receiving device 202 using, for example, a frequency equal or similar to the frequency used by the transmission coil 211L for power transfer.

The first communication circuit 213a may communicate with the first communication circuit 223a using the transmission coil 211L. Data (or communication signals) generated by the first communication circuit 213a may be transmitted using the transmission coil 211L. The first communication circuit 213a may transmit data to the power receiving device 202 using, for example, a frequency shift keying (FSK) modulation scheme. According to various embodiments, the first communication circuit 213a may communicate with the first communication circuit 223a of the power receiving device 202 by changing the frequency of the power signal transmitted through the transmission coil 211L. The first communication circuit 213a may communicate with the first communication circuit 223a of the power receiving device 202 by including data or a communication signal in the power signal generated by the power generation circuit 211b. For example, the first communication circuit 213a may represent data by increasing or decreasing the frequency of a power transmission signal.

For example, the second communication circuit 213b may communicate with a second communication circuit 223b of the power receiving device 202 using a frequency different from the frequency used by the transmission coil 211L for power transfer (e.g., an out-band method). For example, the second communication circuit 213b may obtain information related to a charging state (e.g., information on a voltage value after rectifying, information on a rectified voltage value (e.g., Vrec), information on current flowing through a coil or a rectifier circuit (e.g., Tout), various packets, messages, and the like) from the second communication circuit 223b using any of various short-range communication schemes such as, for example, and without limitation, Bluetooth, Bluetooth low energy (BLE), Wi-Fi, near-field communication (NFC), or the like.

According to various embodiments, the sensing circuit 214 may include one or more sensors, and may detect at least one state of the power transmitting device 201 using one or more sensors.

According to various embodiments, the sensing circuit 214 may include, for example, and without limitation, at least one of a temperature sensor, a motion sensor, a current (or voltage) sensor, or the like. The temperature sensor may detect a temperature state of the power transmitting device 201; the motion sensor may detect a motion state of the power transmitting device 201; and the current (or voltage) sensor may detect a state of an output signal of the power transmitting device 201 (e.g., the magnitude of current, the magnitude of voltage, or the magnitude of power).

According to an embodiment, the current (or voltage) sensor may measure a signal in the power transmission circuit 211. The current (or voltage) sensor may measure a signal in at least a portion of the coil 211L, the matching circuit 211c, or the power generation circuit 211b. For example, the current (or voltage) sensor may include a circuit that measures a signal at an input terminal of the coil 211L.

According to various embodiments, the sensing circuit 214 may be used for foreign object detection (FOD).

According to various embodiments, the power receiving device 202 (e.g., the electronic device 101 in FIG. 1) may include a power reception circuit 221 (e.g., the power management module 188), a controller (e.g., including processing circuitry) 222 (e.g., the processor 120), a communication circuit 223 (e.g., the communication module 190), at least one sensor 224 (e.g., the sensor module 176), a display 225 (e.g., the display device 160), and a detection circuit 226. A described in the configuration of the power receiving device 202 corresponding to the power transmitting device 201 may not be repeated, at least in part.

According to various embodiments, the power reception circuit 221 may include a reception coil 221L for wirelessly receiving power from the power transmitting device 201, a matching circuit 221a, a rectifier circuit 221b for rectifying received AC power to DC power, an adjustment circuit 221c for adjusting a charging voltage, a switch circuit 221d, and a battery 221e (e.g., the battery 189).

According to various embodiments, the controller 222 may include various processing circuitry and perform overall control of the power receiving device 202, and may produce various messages required for wireless power transmission, thereby transmitting the same to the communication circuit 223.

According to various embodiments, the communication circuit 223 may include at least one of a first communication circuit 223a and a second communication circuit 223b. The first communication circuit 223a may communicate with the power transmitting device 201 through the reception coil 221L.

The first communication circuit 223a may communicate with the first communication circuit 213a using the reception coil 221L. Data (or communication signals) generated by the first communication circuit 223a may be transmitted using the reception coil 221L. The first communication circuit 223a may transfer data to the power transmitting device 201 using, for example, an amplitude shift keying (ASK) modulation scheme. The second communication circuit 223b may communicate with the power transmitting device 201 using any of various short-range communication schemes such as, for example, and without limitation, Bluetooth, BLE, Wi-Fi, NFC, or the like.

According to various embodiments, at least one sensor 224 may include, for example, and without limitation, one or more of a current/voltage sensor, a temperature sensor, an illuminance sensor, a sound sensor, or the like.

According to various embodiments, the display 225 may display a variety of display information required for wireless power transmission and reception.

According to various embodiments, the detection circuit 226 may detect the power transmitting device 201 by sensing a discovery signal or power received from the power transmitting device 201. The detection circuit 226 may detect a change in the signal at an input/output terminal of the coil 221L, the matching circuit 221a, or the rectifier circuit 221b due to a coil signal generated by the signal output from the power transmitting device 201. According to various embodiments, the detection circuit 226 may be included in the reception circuit 221.

Figure 3:
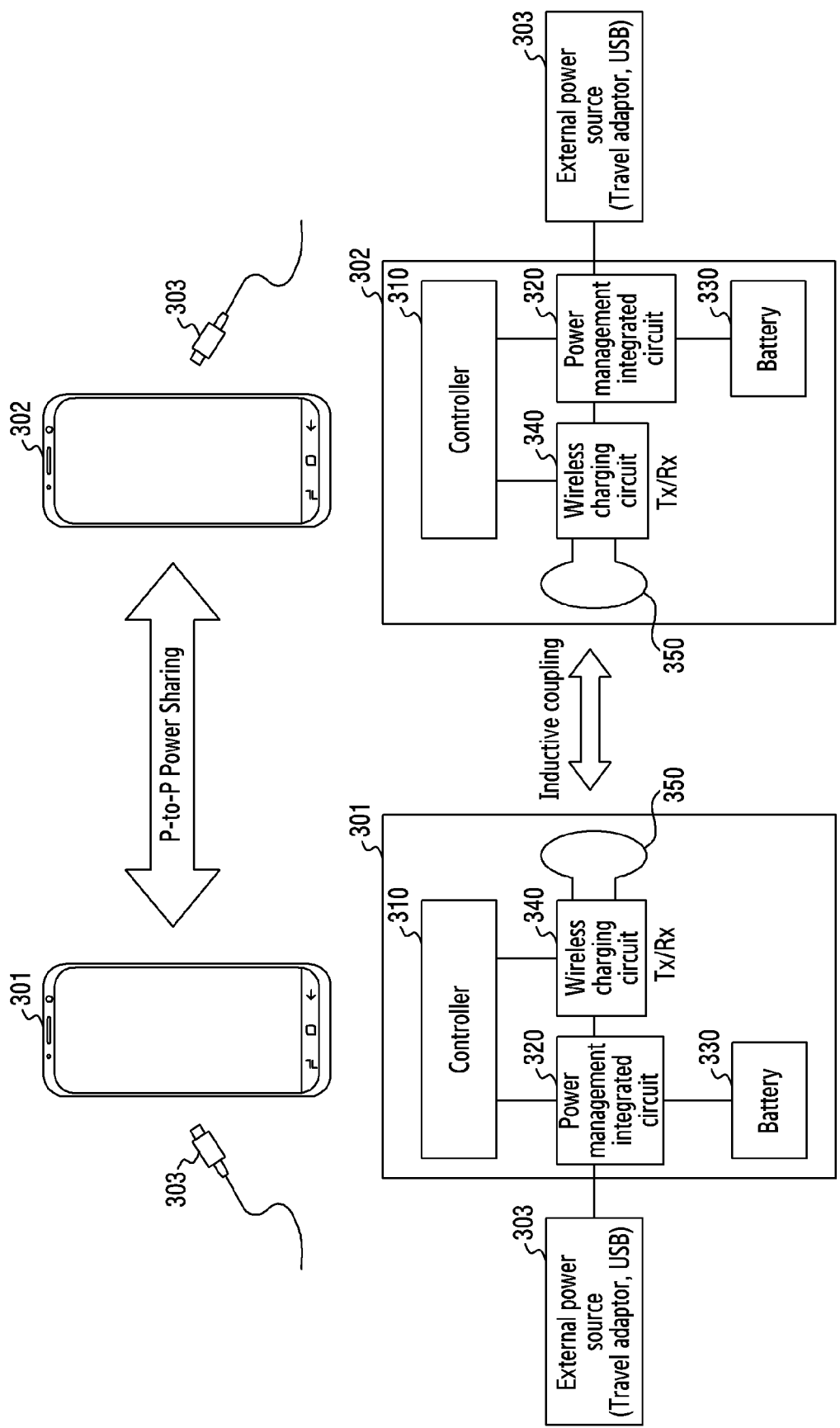
FIG. 3 is a diagram illustrating an example functional configuration of an electronic device according to various embodiments.

FIG. 3 is a diagram illustrating and example configuration for sharing power wirelessly between a first electronic device and a second electronic device according to various embodiments.

Although it is illustrated in FIG. 3 that both a first electronic device 301 (e.g., the electronic device 101 in FIG. 1 or the electronic device 201 in FIG. 2) and a second electronic device 302 (e.g., the electronic device 102 in FIG. 1 or the external electronic device 202 in FIG. 2) are capable of wireless power transmission/reception, one of the first electronic device 301 and the second electronic device 302 may be capable of only wireless power reception. In this disclosure, a description will be made based on the first electronic device 301 on the assumption that the second electronic device 302 is an external electronic device, and the second electronic device 302 may have the same or similar configuration as the first electronic device 301, or may have a configuration obtained by excluding, for example, a wireless power transmission function from the first electronic device 301.

According to an embodiment, the first electronic device 301 may include a coil 350, a wireless charging circuit 340, a power management IC (PMIC) 320, a battery 330 (e.g., the battery 189 in FIG. 1 or the battery 221e in FIG. 2), and/or a controller (e.g., including processing circuitry) 310 (e.g., the processor 120 in FIG. 1 or the controller 222 in FIG. 2).

According to an embodiment, the coil 350 may, for example, be spiral on a flexible printed circuit board (FPCB).

According to an embodiment, the wireless charging circuit 340 may include a full bridge circuit. For example, the wireless charging circuit 340 may perform control such that the full bridge circuit operates as an inverter (direct current (DC) to alternating current (AC)) in a wireless power transmission operation and operates as a rectifier (AC to DC) in a wireless power reception operation.

According to an embodiment, the wireless charging circuit 340 may exchange information necessary for wireless power transmission with the second electronic device 302 through in-band communication according, at least in part, to WPC standards (or non-standards). For example, the in-band communication may be a method of exchanging data between the first electronic device 301 and the second electronic device 302 through frequency modulation or amplitude modulation of a wireless power transmission signal in the state of wireless power transmission between the coil 350 of the first electronic device 301 and the coil 350 of the second electronic device 302. According to various embodiments, the first electronic device 301 and the second electronic device 302 may also communicate with each other using out-band communication. For example, the out-band communication may be different from a wireless power signal, and may, for example, be short-range communication such as, for example, and without limitation, NFC, Bluetooth, Wi-Fi, or the like.

According to an embodiment, the power management IC 320 may have a charging function of charging the battery 330 with wired and wireless input power, a function of communication with an external power source 303 (e.g., a travel adapter) through an external connection terminal (not shown) (e.g., USB battery charging specifications, USB power delivery (PD) communication, AFC communication, and/or quick charge (QC) communication), a function of supplying required power to a system and supplying power corresponding to a voltage level necessary for each device, and/or a function of supplying power to the wireless charging circuit 340 in a wireless power transmission mode. According to an embodiment, the external connection terminal (not shown) may conform to USB standards. For example, the external connection terminal (not shown) may be an interface for USB charging and/or on-the-go (OTG) power supply. According to an embodiment, the external connection terminal (not shown) may be electrically connected to external power sources (a travel adaptor, a battery pack, or the like).

According to an embodiment, the controller 310 may include various processing circuitry and control overall functions of wired and wireless charging of the first electronic device 301, USB communication with the second electronic device 302, and/or communication with the second electronic device 302 (e.g., USB PD, BC1.2, AFC, and/or QC) according to the state of the first electronic device 301. For example, and without limitation, BC1.2, PD, or the like may be an interface for communication with an external power source (TA), and the controller 310 may control communication with an external power source. For example, the state of the first electronic device 301 may include the temperature of the first electronic device 301 and/or the remaining percentage of the battery 330 of the first electronic device 301.

According to various embodiments, the first electronic device 301 (e.g., the electronic device 101 in FIG. 1 or the electronic device 201 in FIG. 2) may operate in a wireless power transmission mode (Tx mode) using the battery 330. If the external power source 303 is connected to the first electronic device 301 in a wired manner through an external connection terminal (not shown), the first electronic device 301 may operate in a Tx mode using power supplied from the external power source 303. If the external power source 303 is connected to the first electronic device 301, the first electronic device 301 may preferentially use the power supplied from the external power source 303 in the Tx mode, and may charge the battery 330 with the remaining power. If the external power source 303 is connected to the first electronic device 301, the first electronic device 301 may supply power supplied from the external power source 303 to the wireless charging circuit 340, and may supply at least some of the remaining power to the battery 330. According to various embodiments, the power may be understood as a signal for obtaining power.

According to various embodiments, the second electronic device 302 (e.g., the electronic device 102 in FIG. 1 or the electronic device 202 in FIG. 2) may operate in a wireless power reception mode (Rx mode). The second electronic device 302 may supply the transmission power of the first electronic device 301 received by the coil 350 to the battery 330, thereby operating in the Rx mode. If the external power source 303 is connected to the second electronic device 302, the second electronic device 302 may charge the battery 330 with power supplied from the external power source 303.

Figure 4A:
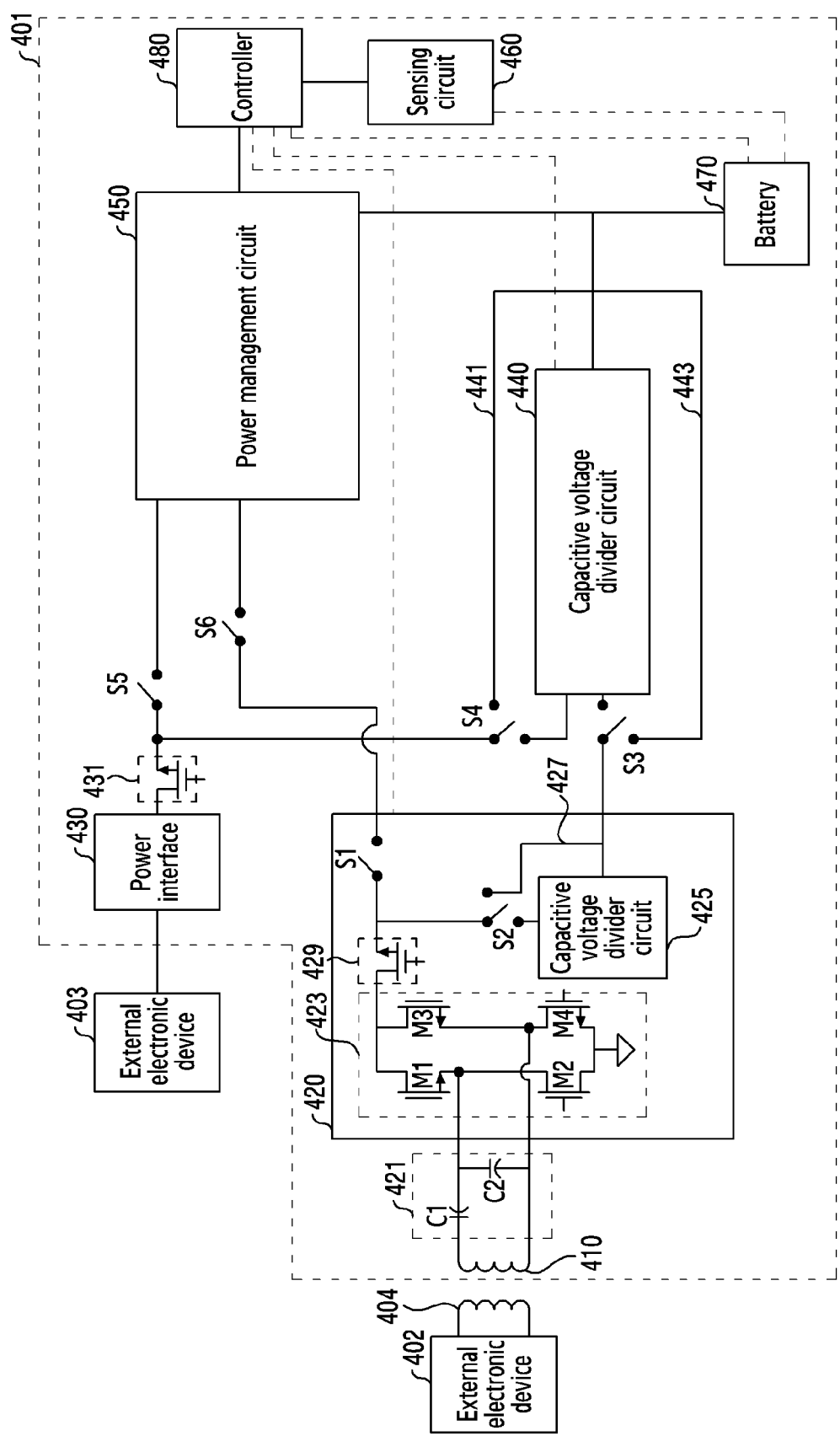
FIG. 4A is a diagram illustrating an example functional configuration of an electronic device according to various embodiments.

FIG. 4A is a diagram illustrating an example functional configuration of an electronic device 401 according to various embodiments. Such a functional configuration may be included in the electronic device 101 shown in FIG. 1, the electronic device 202 shown in FIG. 2, or the electronic device 301 shown in FIG. 3.

Referring to FIG. 4A, the electronic device 401 may include a coil 410, a wireless charging circuit 420, a matching circuit 421, a power interface 430, an overvoltage protection (OVP) switch 431, a capacitive voltage divider circuit 440, at least one bypass circuit 441 and/or 443, a power management IC (PMIC) 450, a sensing circuit 460, a battery 470, a controller (e.g., including processing circuitry) 480, or a combination thereof. In various embodiments, some of the above elements may be omitted and other elements added.

The coil 410 may receive a signal for wirelessly obtaining power from an external electronic device 402 via a coil 404 of the electronic device 402 (e.g., a charging pad supporting wireless charging). In various embodiments, the coil 410 may transmit the received signal for wirelessly obtaining power to the rectifier circuit 423. In various embodiments, the coil 410 may be included in the coil 221L shown in FIG. 2 or the coil 350 shown in FIG. 3, but it is not limited thereto.

The matching circuit 421 may be electrically connected to the coil 410. In various embodiments, the matching circuit 421 may receive a signal for wirelessly obtaining power, which is transmitted from the coil 410. In various embodiments, the matching circuit 421 may transmit, to the wireless charging circuit 420, the signal for wirelessly obtaining power, which is received from the coil 410. In various embodiments, the matching circuit 421 may maximize and/or improve the transmission and reception efficiency of a signal for wirelessly obtaining power between the coil 410 and the coil 404 of the external electronic device 402. In various embodiments, the matching circuit 421 may include a matching device. Although the matching circuit 421 is illustrated as including capacitors C1 and C2 in FIG. 4A, the matching circuit 421 is not limited thereto. For example, the matching circuit 421 may include a capacitor, an inductor, a resistor, or a combination thereof.

Referring to FIG. 4A, the wireless charging circuit 420 may include a rectifier circuit 423, a switch S1, a switch S2, a bypass circuit 427, a low-dropout regulator (LDO) 429 (hereinafter, referred to as "LDO"), a capacitive voltage divider circuit 425, or a combination thereof. In various embodiments, the wireless charging circuit 420 may be electrically connected to the coil 410 via the matching circuit 421. In various embodiments, the wireless charging circuit 420 may convert a signal for wirelessly obtaining power, which is received from the coil 410, to a DC signal through the matching circuit 421, thereby outputting the same. In various embodiments, the wireless charging circuit 420 may include a rectifier circuit 423, at least one switch S1 or S2, or a combination thereof. In various embodiments, the wireless charging circuit 420 may transmit a DC signal converted from the signal for wirelessly obtaining power to the capacitive voltage divider circuit 440 or the power management IC 450 using the switch S1 or S2. In various embodiments, the wireless charging circuit 420 may connect to the capacitive voltage divider circuit 440, the power management IC 450, the battery 470, or a combination thereof according to the on/off state of the switch S1, the switch S2, or a combination thereof. The rectifier circuit 423 may be electrically connected to the coil 410, thereby receiving a signal generated by the coil. In various embodiments, the capacitive voltage divider circuit 425 may be excluded from the wireless charging circuit 420. The capacitive voltage divider circuit 425 may be provided outside the wireless charging circuit 420. The rectifier circuit 423 may be connected to the capacitive voltage divider circuit 440 through the switch S2. In various embodiments, the bypass circuit 427 may be excluded from the wireless charging circuit 420. The rectifier circuit 423 may be connected to the capacitive voltage divider circuit 425 through the switch S2. In various embodiments, the wireless charging circuit 420 may include an LDO 429. The LDO 429 of the wireless charging circuit 420 may be connected to the rectifier circuit 423, thereby receiving a DC signal output from the rectifier circuit 423. The LDO 429 of the wireless charging circuit 420 may be connected to the switch S1, the switch S2, or a combination thereof, thereby transmitting the DC signal received from the rectifier circuit 423 to the switch S1, the switch S2, or a combination thereof. However, the disclosure is not limited thereto. In various embodiments, the wireless charging circuit 420 may include a first LDO (not shown) that is connected to the switch S1 and the rectifier circuit 423, thereby transmitting the DC signal received from the rectifier circuit 423 to the switch S1. In various embodiments, a second LDO (not shown) connected to the switch S2 and the rectifier circuit 423 so as to transmit the DC signal received from the rectifier circuit 423 to the switch S2 may be included. However, the disclosure is not limited thereto. In various embodiments, the switches S1, S2, S3, S4, S5, and S6 of the electronic device 401 or a combination thereof may be integrated with the LDO, thereby performing a low-dropout function.

The connection according to the on/off state of the switch S1, the switch S2 of the wireless charging circuit 420, or a combination thereof will be described in detail below.

In various embodiments, the wireless charging circuit 420 may convert a signal for wirelessly obtaining power, which is received from the coil 410, into a DC signal. In various embodiments, the wireless charging circuit 420 may transmit a DC signal converted from the signal for wirelessly obtaining power to the capacitive voltage divider circuit 440, the power management IC 450, the battery 470, or a combination thereof. For example, the wireless charging circuit 420 may transfer a DC signal converted from the signal for wirelessly obtaining power to the capacitive voltage divider circuit 440, the power management IC 450, or the battery 470. As another example, the wireless charging circuit 420 may transfer a DC signal converted from the signal for wirelessly obtaining power to the capacitive voltage divider circuit 440 and the power management IC 450, or to the battery 470 and the power management IC 450. However, the disclosure is not limited thereto.

The rectifier circuit 423 may be electrically connected to the matching circuit 421. In various embodiments, the rectifier circuit 423 may be configured as a full bridge circuit including switches including, for example, four metal oxide semiconductor field effect transistors (MOSFETs) M1, M2, M3, and M4, and may convert a signal for wirelessly obtaining power, which is received from the matching circuit 421, into a DC signal. In various embodiments, in the case where the rectifier circuit 423 is configured as a full bridge circuit, the switches of the full bridge circuit may include, for example, bipolar junction transistors (BJTs), diodes, or a combination thereof, as well as the MOSFETs.

In various embodiments, the rectifier circuit 423 may transmit a DC signal converted from the signal for wirelessly obtaining power to the capacitive voltage divider circuit 425, the capacitive voltage divider circuit 440, the power management IC 450, the battery 470, or a combination thereof. For example, the rectifier circuit 423 may transmit a DC signal converted from the signal for wirelessly obtaining power to the capacitive voltage divider circuit 425. As another example, the rectifier circuit 423 may directly transmit, to the capacitive voltage divider circuit 440, the DC signal converted from the signal for wirelessly obtaining power bypassing the capacitive voltage divider circuit 425 via the bypass circuit 427. As another example, the rectifier circuit 423 may directly transmit, to the battery 470, a DC signal converted from the signal for wirelessly obtaining power bypassing the capacitive voltage divider circuit 425 and the capacitive voltage divider circuit 440 via the bypass circuit 427 and the bypass circuit 443. As another example, the rectifier circuit 423 may transmit a DC signal converted from the signal for wirelessly obtaining power to the power management IC 450. As another example, the rectifier circuit 423 may transmit a DC signal converted from the signal for wirelessly obtaining power to the capacitive voltage divider circuit 425 and the power management IC 450. As another example, the rectifier circuit 423 may transmit a DC signal converted from the signal for wirelessly obtaining power to the capacitive voltage divider circuit 440 and the power management IC 450. In the example where the rectifier circuit 423 transmits a DC signal converted from the signal for wirelessly obtaining power to the capacitive voltage divider circuit 440 and the power management IC 450, the rectifier circuit 423 may transmit, to the capacitive voltage divider circuit 440, a DC signal converted from the signal for wirelessly obtaining power bypassing the capacitive voltage divider circuit 425 via the bypass circuit 427, and may transmit the DC signal converted from the signal for wirelessly obtaining power to the power management IC 450 at the same time. As another example, the rectifier circuit 423 may transmit a DC signal converted from the signal for wirelessly obtaining power to the battery 470 and the power management IC 450. In the example where the rectifier circuit 423 transmits a DC signal converted from the signal for wirelessly obtaining power to the battery 470 and the power management IC 450, the rectifier circuit 423 may directly transmit, to the battery 470, a DC signal converted from the signal for wirelessly obtaining power bypassing the capacitive voltage divider circuit 425 and the capacitive voltage divider circuit 440 via the bypass circuit 427 and the bypass circuit 443, and may transmit the DC signal converted from the signal for wirelessly obtaining power to the power management IC 450 at the same time.

The capacitive voltage divider circuit 425 may be electrically connected to the rectifier circuit 423. In various embodiments, the capacitive voltage divider circuit 425 may adjust the voltage of an input signal according to a configured voltage division ratio. For example, if the configured voltage division ratio of the capacitive voltage divider circuit 425 is 2:1, the capacitive voltage divider circuit 425 may adjust the voltage of an input signal to 1/2, and then output the signal. In this example, the current of the signal output from the capacitive voltage divider circuit 425 with a configured voltage division ratio of 2:1 may be double the current of the input signal. As another example, when the configured voltage division ratio of the capacitive voltage divider circuit 425 is 4:1, the capacitive voltage divider circuit 425 may adjust the voltage of an input signal to 1/4, and then output the signal. In this example, the current of the signal output from the capacitive voltage divider circuit 425 with a configured voltage division ratio of 4:1 may be quadruple the current of the input signal. In various embodiments, the capacitive voltage divider circuit 425 may transmit the signal having an adjusted voltage to the capacitive voltage divider circuit 440 or the battery 470. For example, the capacitive voltage divider circuit 425 may transmit the signal having an adjusted voltage to the capacitive voltage divider circuit 440. As another example, the capacitive voltage divider circuit 425 may transmit the signal having an adjusted voltage to the battery 470. In the example where the capacitive voltage divider circuit 425 transmits the signal having an adjusted voltage to the capacitive battery 470, the capacitive voltage divider circuit 425 may directly transmit the signal having the adjusted voltage to the battery 470, bypassing the capacitive voltage divider circuit 440 via the bypass circuit 443.

The power interface 430 may be electrically connected to the external electronic device 403 (e.g., a travel adapter or a power supply that supports wired charging). In various embodiments, the power interface 430 may receive, from the external electronic device 403, a signal for obtaining power in a wired manner. In various embodiments, the power interface 430 may be connected to the overvoltage protection (OVP) switch 431. In various embodiments, if the voltage of a signal for obtaining power, which is input through the power interface 430, is equal to or greater than a specified voltage, the overvoltage protection switch 431 may be opened to prevent a voltage equal to or greater than a specified voltage from being applied to the capacitive voltage divider circuit 440, the power management IC 450, or a combination thereof. In various embodiments, the power interface 430 may include a power line, a data line, or a combination thereof. In various embodiments, the power interface 430 may transmit a signal for obtaining power in a wired manner, which is received from the external electronic device 403, to the battery 470, the capacitive voltage divider circuit 440, and the power management IC 450, or a combination thereof. For example, the power interface 430 may transmit a signal for obtaining power in a wired manner to the capacitive voltage divider circuit 440. As another example, the power interface 430 may transmit a signal for obtaining power in a wired manner to the power management IC 450. As another example, the power interface 430 may transmit a signal for obtaining power in a wired manner to the capacitive voltage divider circuit 440 and the power management IC 450. As another example, the power interface 430 may transmit a signal for obtaining power in a wired manner to the battery 470, bypassing the capacitive voltage divider circuit 440 via the bypass circuit 441. As another example, the power interface 430 may transmit a signal for obtaining power in a wired manner to the battery 470, bypassing the capacitive voltage divider circuit 440 via the bypass circuit 441, and may transmit the same to the power management IC 450 at the same time.

The capacitive voltage divider circuit 440 may be electrically connected to the wireless charging circuit 420 and the power interface 430. In various embodiments, if the capacitive voltage divider circuit 440 is connected to the wireless charging circuit 420, the capacitive voltage divider circuit 440 may receive a DC signal from the capacitive voltage divider circuit 425, or may receive a DC signal from the bypass circuit 427 bypassing the capacitive voltage divider circuit 425 according to the on/off state of the switch S2. In various embodiments, the capacitive voltage divider circuit 440 may adjust the voltage of an input signal according to a configured voltage division ratio. For example, if the configured voltage division ratio of the capacitive voltage divider circuit 440 is 2:1, the capacitive voltage divider circuit 440 may adjust the voltage of an input signal to 1/2, and then output the signal. In this example, the current of the signal output from the capacitive voltage divider circuit 440 with a configured voltage division ratio of 2:1 may be double the current of the input signal. As another example, when the configured voltage division ratio of the capacitive voltage divider circuit 440 is 4:1, the capacitive voltage divider circuit 440 may adjust the voltage of an input signal to 1/4, and then output the signal. In this example, the current of the signal output from the capacitive voltage divider circuit 440 with a configured voltage division ratio of 4:1 may be quadruple the current of the input signal. In various embodiments, the capacitive voltage divider circuit 440 may transmit the signal having an adjusted voltage to the battery 470.

The power management IC 450 may be electrically connected to the wireless charging circuit 420 and the power interface 430. In various embodiments, in the example where the power management IC 450 is connected to the wireless charging circuit 420, the power management IC 450 may be connected to the wireless charging circuit 420 through a switch S6. In various embodiments, the power management IC 450 may adjust the voltage, the current, or a combination thereof of an input signal, and may then transmit the same to at least one of the battery 470, the controller 480, or a combination thereof. In various embodiments, the power management IC 450 may adjust the voltage, the current, or a combination thereof of an input signal according to configured power output information. For example, where the power management IC 450 transmits an input signal to the battery 470, the power management IC 450 may adjust the voltage, the current, or a combination thereof of an input signal according to power output information configured with respect to the battery 470 (e.g., may adjust the voltage, the current, or a combination thereof of an input signal according to battery information (e.g., a battery voltage)), and may transmit the signal of the adjusted voltage, the current, or a combination thereof to the battery 470. As another example, in the example where the power management IC 450 adjusts the voltage of an input signal and transmits the same to the controller 480, the power management IC 450 may adjust the voltage, the current, or a combination thereof of an input signal according to power output information configured with respect to the controller 480, and may transmit, to the controller 480, the signal of the voltage, the current, or combination thereof adjusted according to the power output information configured with respect to the controller 480. As another example, if the power management IC 450 adjusts the voltage, the current, or a combination thereof of an input signal and transmits the same to the battery 470 and the controller 480, the power management IC 450 may adjust the voltage, the current, or a combination thereof of an input signal according to power output information configured with respect to the battery 470, thereby transmitting, to the battery 470, the signal of the voltage, the current, or a combination thereof adjusted according to the power output information configured with respect to the battery 470, and at the same time, the power management IC 450 may adjust the voltage, the current, or a combination thereof of an input signal according to power output information configured with respect to the controller 480, thereby transmitting, to the controller 480, the signal of the voltage, the current, or a combination thereof adjusted according to the power output information configured with respect to the controller 480. In various embodiments, the power interface 430 may be connected to the controller 480 through the switch S5, and may be connected to the capacitive voltage divider circuit 440 or the battery 470 through the switch S4. In various embodiments, the wireless charging circuit 420 may be connected to the controller 480 through the switch S1, and may be connected to the capacitive voltage divider circuit 440, the battery 470, or a combination thereof through the switch S2.

The sensing circuit 460 may include one or more sensors, and may detect one or more states of the electronic device 401 using the one or more sensors. In various embodiments, the sensing circuit 460 may generate electrical signals, data values, or combinations thereof corresponding to the detected states. In various embodiments, the sensing circuit 460 may transmit the generated electrical signals, data values, or combinations thereof to the controller 480. In various embodiments, the sensing circuit 460 may include, for example, and without limitation, a temperature sensor, a voltage sensor, a current sensor, or the like, or any combination thereof. In various embodiments, the sensing circuit 460 may detect a temperature state of the electronic device 401 using a temperature sensor, and may generate an electrical signal, a data value, or a combination thereof corresponding to the detected temperature state. In various embodiments, the sensing circuit 460 may detect a voltage state of the electronic device 401 using a voltage sensor, and may generate an electrical signal, a data value, or a combination thereof corresponding to the detected voltage state. In various embodiments, the sensing circuit 460 may detect a current state of the electronic device 401 using a current sensor, and may generate an electrical signal, a data value, or a combination thereof corresponding to the detected current state. For example, the sensing circuit 460 may generate an electrical signal, a data value, or a combination thereof corresponding to the voltage state, the current state, the temperature state, or a combination thereof of the coil 410, the wireless charging circuit 420, the power interface 430, the capacitive voltage divider circuit 440, the power management IC 450, the battery 470, the controller 480, or a combination thereof.

The battery 470 may receive a signal from the wireless charging circuit 420, the capacitive voltage divider circuit 440, the power management IC 450, the external electronic device, or a combination thereof, and may perform power charging to correspond to the received signal. In various embodiments, the battery 470 may be included in the battery 189 shown in FIG. 1, the battery 221e shown in FIG. 2, or the battery 330 shown in FIG. 3. In various embodiments, the battery 470 may have a structure in which at least two batteries are connected in series, in parallel, or in a combination thereof.

The controller 480 may be included in the processor 120 shown in FIG. 1. In various embodiments, the controller 480 may include various processing circuitry and control the on/off states of the switches S1 to S6, may produce a path between the coil 410 and the battery 470, or may produce a path between the power interface 430 and the battery 470. In various embodiments, the controller 480 may be connected to the switches S1 to S6, thereby directly controlling the on/off states of the switches S1 to S6. In various embodiments, the controller 480 may be connected to the switches S1 and S2 through the wireless power circuit 420 so as to transmit, to the wireless power circuit 420, a control command for controlling the on/off states of the switches S1 and S2, thereby controlling the on/off states of the switches S1 and S2. In various embodiments, the controller 480 may perform control so as to produce a path in which the coil 410 is electrically connected to the battery 470 via the wireless charging circuit 420 (hereinafter, this path will be referred to as a "first path"). In various embodiments, a signal for obtaining power from the external electronic device 402, which is received by the coil 410, may be transmitted to the battery 470 through the first path. In various embodiments, a signal for supplying power from the battery 470 may be transmitted to the external electronic device 402 through the first path. In various embodiments, the controller 480 may perform control such that the coil 410 is electrically connected to the battery 470 via the wireless charging circuit 420 through a first sub-path via the capacitive voltage divider circuit 425 of the wireless charging circuit 420 with respect to the first path and a second sub-path bypassing the capacitive voltage divider circuit 425 with respect to the first path using the bypass circuit 427 by controlling the state of the switch S2. In various embodiments, the controller 480 may perform control so as to produce a path in which the coil 410 is electrically connected to the battery 470 via the wireless charging circuit 420 and the capacitive voltage divider circuit 440 (hereinafter, this path will be referred to as a "second path"). In various embodiments, a signal for obtaining power from the external electronic device 402, which is received by the coil 410, may be transmitted to the battery 470 through the second path. In various embodiments, a signal for supplying power from the battery 470 may be transmitted to the external electronic device 402 through the second path. In various embodiments, the controller 480 may perform control such that the coil 410 is electrically connected to the battery 470 via the wireless charging circuit 420 and the capacitive voltage divider circuit 440 through a first sub-path via the capacitive voltage divider circuit 425 of the wireless charging circuit 420 with respect to the second path and a second sub-path bypassing the capacitive voltage divider circuit 425 with respect to the second path using the bypass circuit 427 by controlling the state of the switch S2. In various embodiments, the controller 480 may perform control so as to produce a path in which the coil 410 is electrically connected to the battery 470 via the wireless charging circuit 420 and the power management IC 450 (hereinafter, this path will be referred to as a "third path"). In various embodiments, a signal for obtaining power from the external electronic device 402, which is received by the coil 410, may be transmitted to the battery 470 through the third path. In various embodiments, a signal for supplying power from the battery 470 may be transmitted to the external electronic device 402 through the third path. In various embodiments, the controller 480 may perform control so as to produce a path in which the power interface 430 is directly and electrically connected to the battery 470 (hereinafter, this path will be referred to as a "fourth path"). In various embodiments, a signal for obtaining power from the external electronic device 403, which is received by the coil 410, may be transmitted to the battery 470 through the fourth path. In various embodiments, a signal for supplying power from the battery 470 may be transmitted to the external electronic device 403 through the fourth path. In various embodiments, the controller 480 may perform control so as to produce a path in which the power interface 430 is electrically connected to the battery 470 via the capacitive voltage divider circuit 440 (hereinafter, this path will be referred to as a "fifth path"). In various embodiments, a signal for obtaining power from the external electronic device 403, which is received by the coil 410, may be transmitted to the battery 470 through the fifth path. In various embodiments, a signal for supplying power from the battery 470 may be transmitted to the external electronic device 403 through the fifth path. In various embodiments, the controller 480 may perform control so as to produce a path in which the power interface 430 is electrically connected to the battery 470 via the power management IC 450 (hereinafter, this path will be referred to as a "sixth path"). In various embodiments, a signal for obtaining power from the external electronic device 403, which is received by the coil 410, may be transmitted to the battery 470 through the sixth path. In various embodiments, a signal for supplying power from the battery 470 may be transmitted to the external electronic device 403 through the sixth path. Control by the controller 480 of the switches S1 to S6 in order to produce the first to sixth paths may be expressed as shown, for example, in Table 1 below.

TABLE 1

| | S1 | S2 | S3 | S4 | S5 | S6 |
|---|---|---|---|---|---|---|
| First sub-path of first path | off state | first on state | second on state | off state | don't care | don't care |
| Second sub-path of first path | off state | second on state | second on state | off state | don't care | don't care |
| First sub-path of second path | off state | first on state | first on state | off state | don't care | don't care |
| Second sub-path of second path | off state | second on state | first on state | off state | don't care | don't care |
| Third path | on state | off state | don't care | don't care | off state | on state |
| Fourth path | don't care | don't care | off state | second on state | off state | don't care |
| Fifth path | don't care | don't care | off state | first on state | off state | don't care |
| Sixth path | don't care | don't care | don't care | off state | on state | off state |

As shown in Table 1, the controller 480 may perform control such that the switches S1 to S6 are in one of an on state and an off state. In various embodiments, the controller 480 may perform control such that the switches indicated as "don't care" in Table 1 are in an off state. For example, in the control of on/off states of the switches S1 to S6 for producing the third path, the controller 480 may control the switches S4 and S5 so as to be in an off state. However, the disclosure is not limited thereto. In various embodiments, the controller 480 may perform control such that the switches indicated as "don't care" in Table 1 are in an on state. For example, in order to produce the third path and the fourth path, the controller 480 may control the on/off states of the switches S1 to S6 such that the switches S1 and S6 are in an on state, the switches S2, S3, and S5 are in an off state, and the switch S4 is in an on state.

As shown in Table 1, in order to produce the first sub-path of the first path, the controller 480 may perform control so as to convert the switch S1 and the switch S4 to an off state, may perform control so as to convert the switch S2 to a first on state, and may perform control so as to convert the switch S3 to a second on state. The rectifier circuit 423 and the capacitive voltage divider circuit 425 may be connected to each other in the first on state of the switch S2; the rectifier circuit 423 and the bypass circuit 427 may be connected to each other in the second on state of the switch S2; and the off state of the switch S2 may indicate an open state. In addition, the wireless charging circuit 420 and the capacitive voltage divider circuit 440 may be connected to each other in the first on state of the switch S3; the wireless charging circuit 420 and the bypass circuit 443 may be connected to each other in the second on state of the switch S3; and the off state of the switch S3 may indicate an open state.

In addition, as shown in Table 1, in order to produce the second sub-path of the first path, the controller 480 may perform control so as to convert the switch S1 and the switch S4 to an off state, may perform control so as to convert the switch S2 to a second on state, and may perform control so as to convert the switch S3 to a second on state.

In addition, in order to produce the first sub-path of the second path, the controller 480 may perform control so as to convert the switch S1 and the switch S4 to an off state, may perform control so as to convert the switch S2 to a first on state, and may perform control so as to convert the switch S3 to a second on state.

In addition, as shown in Table 1, in order to produce the second sub-path of the second path, the controller 480 may perform control so as to convert the switch S1 and the switch S4 to an off state, may perform control so as to convert the switch S2 to a second on state, and may perform control so as to convert the switch S3 to a second on state.

In addition, as shown in Table 1, in order to produce the third path, the controller 480 may perform control so as to convert the switch S1 and the switch S6 to an on state, and may perform control so as to convert the switch S2 and the switch S5 to an off state. In this example, the controller 480 may perform control so as to convert the switch S2, the switch S3, or a combination thereof, instead of the switch S2, to an off state in order to produce the third path. The rectifier circuit 423 and the capacitive voltage divider circuit 425 may be connected to each other in the first on state of the switch S2; the rectifier circuit 423 and the bypass circuit 427 may be connected to each other in the second on state of the switch S2; and the off state of the switch S2 may indicate an open state. In addition, the wireless charging circuit 420 and the capacitive voltage divider circuit 440 may be connected to each other in the first on state of the switch S3; the wireless charging circuit 420 and the bypass circuit 443 may be connected to each other in the second on state of the switch S3; and the off state of the switch S3 may indicate an open state.

In addition, as shown in Table 1, in order to produce the fourth path, the controller 480 may perform control so as to convert the switch S3 and the switch S5 to an off state, and may perform control so as to convert the switch S4 to a second on state. In this example, the controller 480 may perform control so as to convert the switch S3, the switch S2, or a combination thereof, instead of the switch S3, to an off state in order to produce the fourth path. The power interface 430 and the capacitive voltage divider circuit 440 may be connected to each other in the first on state of the switch S4; the power interface 430 and the bypass circuit 441 may be connected to each other in the second on state of the switch S4; and the off state of the switch S4 may indicate an open state.

In addition, as shown in Table 1, in order to produce the fifth path, the controller 480 may perform control so as to convert the switch S3 and the switch S5 to an off state, and may perform control so as to convert the switch S4 to a first on state. In this example, the controller 480 may perform control so as to convert the switch S3, the switch S2, or a combination thereof, instead of the switch S3, to the off state in order to produce the fifth path.

In addition, as shown in Table 1, in order to produce the sixth path, the controller 480 may perform control so as to convert the switches S4 and S6 to an off state, and may perform control so as to convert the switch S5 to an on state.

Hereinafter, a control process of the controller 480 will be described in greater detail with reference to the drawings.

In various embodiments, the controller 480 may perform control so as to execute a direct mode, a power management mode, or a combination thereof, based on power transmission information received from an external electronic device. In various embodiments, the controller 480 may determine whether a direct mode is supported, based on identification information received from the external electronic device 402, the external electronic device 403, or a combination thereof, using an in-band scheme, an out-band scheme, or a combination thereof. In various embodiments, the controller 480 may determine whether a direct mode is supported, based on power transmission information received from the external electronic device 402, the external electronic device 403, or a combination thereof, using an in-band scheme, an out-band scheme, or a combination thereof. In various embodiments, the controller 480 may compare the maximum voltage (e.g., 20V) of a signal for obtaining transmittable power, which is contained in power transmission information, with a configured voltage range (e.g., 9V or more), thereby determining whether a direct mode is supported. For example, if the maximum voltage (e.g., 20V) of a signal for obtaining power that the external electronic device 402 is able to transmit in a wired manner, which is contained in the power transmission information of the external electronic device 402, falls within a configured voltage range (e.g., 9V or more), the controller 480 may determine that it is possible to support a direct mode, based on the power transmission information received from the external electronic device 402. As another example, if the maximum voltage (e.g., 8V) of a signal for obtaining power that the external electronic device 402 is able to transmit in a wired manner, which is contained in the power transmission information of the external electronic device 402, does not belong to a configured voltage range (e.g., 9V or more), the controller 480 may determine that it is not possible to support a direct mode, based on the power transmission information received from the external electronic device 402. In addition, for example, the controller 480 may compare the maximum voltage of a signal for obtaining the power that the external electronic device 403 is able to transmit in a wired manner, which is contained in power transmission information of the external electronic device 403, with a configured voltage range, thereby determining whether a direct mode is supported, based on the power transmission information received from the external electronic device 403. The direct mode may be a control mode of the controller 480 for producing a path through which an arbitrary signal is transmitted and received between the external electronic device and the battery without passing through the power management IC 450. In addition, the power management mode may be a control mode of the controller 480 for producing a path in which an arbitrary signal is transmitted and received between the external electronic device and the battery via the power management IC 450. If the arbitrary signal is a signal for obtaining power from an external electronic device, the direct mode may be a direct charging mode, and the power management mode may be a power management charging mode. In addition, if the arbitrary signal is a signal for supplying power from the battery 470 to an external electronic device, the direct mode may be a direct supply mode, and the power management mode may be a power management supply mode.

In various embodiments, if it is determined that it is possible to support a direct mode, the controller 480 may perform control so as to execute a direct mode, a power management mode, or a combination thereof. In various embodiments, if it is determined that it is possible to support a direct mode, the controller 480 may perform control so as to execute a direct mode. In various embodiments, if it is determined that it is possible to support a direct mode, the controller 480 may perform control so as to execute the direct mode, and may perform control so as to execute the power management mode at the same time. In various embodiments, the controller 480 may perform control so as to execute the power management mode even if it is determined that it is possible to support the direct mode. In various embodiments, if it is determined that it is not possible to support a direct mode, the controller 480 may perform control so as to execute a power management mode. In various embodiments, the paths according to the direct mode may include a first path, a second path, a fourth path, a fifth path, or a combination thereof. In various embodiments, the paths according to the power management mode may include a third path, a sixth path, or a combination thereof. In various embodiments, the paths according to the direct mode for connecting the external electronic device 402 with the battery 470 may include a first path, a second path, or a combination thereof. In various embodiments, the path according to the power management mode for connecting the external electronic device 402 with the battery 470 may include a third path. In various embodiments, the paths according to the direct mode for connecting the external electronic device 403 with the battery 470 may include a fourth path, a fifth path, or a combination thereof. In various embodiments, the path according to the power management mode for connecting the external electronic device 403 with the battery 470 may include a sixth path.

In various embodiments, if it is determined that it is possible to support a direct mode, based on the power transmission information received from the external electronic device 402, the controller 480 may perform control so as to produce a first path, a second path, or a combination thereof, among the paths according to the direct mode, thereby executing the direct mode. In various embodiments, if it is determined that it is possible to support a direct mode, based on the power transmission information received from the external electronic device 402, the controller 480 may perform control so as to produce a third path, which is a path according to the power management mode, while performing control so as to execute the direct mode, thereby executing the power management mode. In various embodiments, even if it is determined that it is possible to support a direct mode, based on the power transmission information received from the external electronic device 402, the controller 480 may perform control so as to produce a third path that is a path according to the power management mode, thereby executing the power management mode. For example, if it is determined that it is possible to support a direct mode, based on the power transmission information received from the external electronic device 402, the controller 480 may perform control so as to produce a first path, thereby executing the direct mode, or may perform control so as to produce a second path, thereby executing the direct mode. As another example, if it is determined that it is possible to support a direct mode, based on the power transmission information received from the external electronic device 402, the controller 480 may perform control so as to produce a first path and a third path, thereby executing the direct mode and the power management mode, and may perform control so as to produce a second path and a third path, thereby executing the direct mode and the power management mode. As another example, even if it is determined that it is possible to support the direct mode, based on the power transmission information received from the external electronic device 402, the controller 480 may perform control so as to produce a third path, thereby executing the power management mode. In various embodiments, if it is determined that it is not possible to support a direct mode, based on the power transmission information received from the external electronic device 402, the controller 480 may perform control so as to produce a third path, among the paths according to the power management mode, thereby executing the power management mode.

In various embodiments, if it is determined that it is possible to support the direct mode, based on the power transmission information received from the external electronic device 403, the controller 480 may perform control so as to produce a fourth path, a fifth path, or a combination thereof, among the paths according to the direct mode, thereby executing the direct mode. In various embodiments, if it is determined that it is possible to support the direct mode, based on the power transmission information received from the external electronic device 403, the controller 480 may perform control so as to produce a sixth path that is a path according to the management mode while performing control so as to execute the direct mode, thereby executing the power management mode. In various embodiments, even if it is determined that it is possible to support the direct mode, based on the power transmission information received from the external electronic device 403, the controller 480 may perform control so as to produce a sixth path that is a path according to the power management mode, thereby executing the power management mode. For example, if it is determined that it is possible to support a direct mode, based on the power transmission information received from the external electronic device 403, the controller 480 may perform control so as to produce a fourth path, thereby executing the direct mode, or may perform control so as to produce a fifth path, thereby executing the direct mode. As another example, if it is determined that it is possible to support the direct mode, based on the power transmission information received from the external electronic device 403, the controller 480 may perform control so as to produce a fourth path and a sixth path, thereby executing the direct mode and the direct management mode, or may perform control so as to produce a fifth path and a sixth path, thereby executing the direct mode and the power management mode. As another example, even if it is determined that it is possible to support the direct mode, based on the power transmission information received from the external electronic device 403, the controller 480 may perform control so as to produce a sixth path, executing the power management mode. In various embodiments, if it is determined that it is not possible to support the direct mode, based on the power transmission information received from the external electronic device 403, the controller 480 may perform control so as to produce a sixth path, among the paths according to the power management mode, thereby executing the power management mode.

In various embodiments, if the electronic device 401 simultaneously receives signals for obtaining power from the external electronic device 402 and the external electronic device 403, the controller 480 may determine whether to support the direct mode for the signal for wirelessly obtaining power, based on the power transmission information received from the external electronic device 402, and may determine whether to support the direct mode for a signal for obtaining power in a wired manner, based on the power transmission information received from the external electronic device 403. In various embodiments, based on the operation of determining whether the direct mode is supported, the controller 480 may perform control so as to produce a path for a signal for wirelessly obtaining power and a path for a signal for obtaining power in a wired manner.

In various embodiments, the controller 480 may perform control so as to execute a direct mode, a power management mode, or a combination thereof, based on data values received from the sensing circuit 460. In various embodiments, the controller 480 may determine whether a direct mode is supported, based on a data value corresponding to a voltage state, a current state, a temperature state, or a combination thereof of the rectifier circuit 423, the capacitive voltage divider circuit 425, the capacitive voltage divider circuit 440, the power management IC 450, the power interface 430, the battery 470, or a combination thereof, which is received from the sensing circuit 460. In various embodiments, the controller 480 may compare the data value from the sensing circuit 460 with a reference range according to the type of data value, thereby determining whether to support the direct mode. In various embodiments, if a voltage value of the rectifier circuit 423, the capacitive voltage divider circuit 425, the capacitive voltage divider circuit 440, the power management IC 450, the power interface 430, the battery 460, the coil 410, or a combination thereof falls within a configured voltage range, the controller 480 may determine that it is possible to support a direct mode. In various embodiments, if a current value of the rectifier circuit 423, the capacitive voltage divider circuit 425, the capacitive voltage divider circuit 440, the power management IC 450, the power interface 430, the battery 460, the coil 410, or a combination thereof falls within a configured current range, the controller 480 may determine that it is possible to support a direct mode. In various embodiments, if a temperature value of the rectifier circuit 423, the capacitive voltage divider circuit 425, the capacitive voltage divider circuit 440, the power management IC 450, the power interface 430, the battery 460, the coil 410, or a combination thereof falls within a configured temperature range, the controller 480 may determine that it is possible to support a direct mode. In various embodiments, if it is determined that it is possible to support the direct mode, the controller 480 may perform control so as to execute a direct mode, may perform control so as to execute a direct mode and a power management mode, or may perform control so as to execute a power management mode. In various embodiments, if it is determined that it is not possible to support the direct mode, the controller 480 may perform control so as to execute a power management mode.

In various embodiments, in the example where the electronic device 401 simultaneously receives signals for obtaining power from the external electronic device 402 and the external electronic device 403, the controller 480 may determine whether a direct mode is supported for a signal for wirelessly obtaining power, based on whether an output voltage value of the rectifier circuit 423 falls within a configured voltage range or based on the power transmission information received from the external electronic device 402, and may determine whether a direct mode is supported for a signal for obtaining power in a wired manner, based on whether an input voltage value of the power interface 430 falls within a configured voltage range or based on the power transmission information received from the external electronic device 403. In various embodiments, the controller 480 may perform control so as to produce a path for a signal for wirelessly obtaining power and a path for signal for obtaining power in a wired manner, based on the determination on whether the direct mode is supported. In various embodiments, if it is determined that it is possible to support a direct mode, the controller 480 may perform control so as to execute the direct mode, may perform control so as to execute the direct mode and the power management mode, or may perform control so as to execute the power management mode. In various embodiments, if it is determined that it is not possible to support the direct mode, the controller 480 may perform control so as to execute the power management mode.

In various embodiments, the controller 480 may compare a data value corresponding to the voltage state of the battery 470, which is received from the sensing circuit 460, with reference ranges according to the type of data value (e.g., a voltage range according to a pre-charge charging mode, a voltage range according to a trickle-charge charging mode, a voltage range according to a constant-current charging mode, a voltage range according to a constant-voltage charging mode, a voltage range according to a re-charge charging mode, or a combination thereof), and may select a direct mode, a power management mode, or a combination thereof. For example, if a data value corresponding to the voltage state of the battery 470 falls within a voltage range according to a pre-charge charging mode, a voltage range according to a trickle-charge charging mode, or a combination thereof, the controller 480 may select a power management mode. In this example, a signal for wirelessly obtaining power, which is input from the external electronic device 402, may be provided to the battery 470 via a third path, and a signal for obtaining power in a wired manner, which is received from the external electronic device 403, may be provided to the battery 470 through a sixth path. As another example, if a data value corresponding to the voltage state of the battery 470 falls within the voltage range according to a constant-current charging mode, the voltage range according to a constant-voltage charging mode, or a combination thereof, the controller 480 may select a direct mode, a power management mode, or a combination thereof. In this example, a signal for wirelessly obtaining power input from the external electronic device 402 may be provided to the battery 470 through a first path, a second path, a third path, or a combination thereof, and a signal for obtaining power in a wired manner, which is input from the external electronic device 403, may be provided to the battery 470 through a fourth path, a fifth path, a sixth path, or a combination thereof. As another example, if a data value corresponding to the voltage state of the battery 470 falls within a voltage range according to the re-charge charging mode, the controller 480 may select a direct mode, a power management mode, or a combination thereof. In this example, a signal for obtaining power input from the external electronic device 402, the external electronic device 403, or a combination thereof may be provided to the battery 470 through a first path, a second path, a third path, a fourth path, a fifth path, a sixth path, or a combination thereof. However, the disclosure is not limited thereto. The pre-charge charging mode may be a battery charging mode in which, if the level of the battery 470 is less than or equal to a configured pre-charge voltage, the current of a signal for obtaining power supplied to the battery 470 is limited to a configured pre-charge current. The trickle-charge charging mode may be a battery charging mode in which the current of a signal for obtaining power supplied to the battery 470 is limited to a configured trickle-charge current if the battery voltage 470 reaches a configured trickle-charge voltage range by pre-charging the battery 470. The constant-current charging mode may be a battery charging mode in which the current of a signal for obtaining power supplied to the battery 470 is limited to a configured constant current if the battery voltage 470 falls outside of a configured trickle-charge voltage range by trickle-charging of the battery 470. The constant-voltage charging mode may be a battery charging mode in which the voltage of a signal for obtaining power supplied to the battery 470 is limited to a configured constant voltage if the battery voltage 470 reaches a configured voltage by constant-current charging of the battery 470. If the power charging of the battery 470 is completed according to the constant-voltage charging mode, the charging of the battery 470 may be terminated. The re-charge charging mode may be a battery charging mode in which the voltage of a signal for obtaining power supplied to the battery 470 is limited to a configured constant voltage if the battery voltage 470 drops to a re-charge voltage after terminating the charging of the battery 470.

In various embodiments, the electronic device 401 may be connected to the external electronic device 403 through an on-the-go (OTG) scheme. The on-the-go (OTG) scheme is defined according to the universal serial bus (USB) standard and indicates a function of performing communication using a USB between electronic devices, such as smartphones, tablet PCs, or the like, or between an electronic device and peripheral devices such as, for example, and without limitation, a mouse, a keyboard, a USB memory, or the like, without a PC. In various embodiments, the electronic device 401 may receive OTG information from the external electronic device 403 through the OTG scheme, and may supply power to the external electronic device 403, based on the received OTG information. In various embodiments, the OTG information may be a required voltage range or a required voltage of the external electronic device 403. However, the disclosure is not limited thereto.

In various embodiments, if the external electronic device 403 is recognized, the controller 480 may perform control so as to produce a path for supplying a signal output from the battery 470 (e.g., a DC signal of 5V) to the external electronic device. The controller 480 may perform control so as to execute a direct mode, a power management mode, or a combination thereof, based on the OTG information received from the recognized external electronic device 403. In various embodiments, the controller 480 may compare a required voltage range of a signal for supplying power, which is contained in the OTG information received from the recognized external electronic device, with a data value corresponding to the battery voltage 470, which is transmitted from the sensing circuit 460, and correction values of the data value, thereby determining whether a direct mode is supported. For example, if a data value, correction values of the data value, or a combination thereof are included in identification information, a required voltage range of a signal for supplying power, or a combination thereof, which is contained in the OTG information, the controller 480 may determine that it is possible to support a direct mode. For example, a signal output from the battery 470 may be supplied to the external electronic device 403 using the path of the bypass circuit 441 and the power interface 430, or may be supplied to the external electronic device 403 using the path of the capacitive voltage divider circuit 440 and the power interface 430.

In various embodiments, the electronic device 401 may identify a required voltage range of a signal for supplying power, which is contained in request power information received from the external electronic device, thereby transmitting power. For example, if a signal for supplying power through the coil 410 is transmitted to the external electronic device 402, a configured voltage division ratio of the capacitive voltage divider circuit 425 and/or a configured voltage division ratio of the capacitive voltage divider circuit 440 may be inversely applied to a data value, and a result thereof may be transmitted based on a computable value. If a signal for supplying power through the power interface 430 is transmitted to an external electronic device, a configured voltage division ratio of the capacitive voltage divider circuit 440 may be inversely applied to a data value, and a result thereof may be transmitted based on a computable value. For example, in the example where a signal for supplying power through the coil 410 is transmitted to an external electronic device, if the configured voltage division ratio of the capacitive voltage divider circuit 425 is 3:1, if the configured voltage division ratio of the capacitive voltage divider circuit 440 is 2:1, and if the data value is 5V, the correction values may be 10V, 15V, and 30V. However, the disclosure is not limited thereto.

In various embodiments, if the controller 480 determines whether a direct mode is supported, based on the power transmission request information received from the external electronic device 402, the controller 480 may perform control so as to produce at least one of a first path and a second path, among the paths according to the direct mode, and a third path, among the paths according to the power management mode (if it is determined that it is possible to support the direct mode), or may perform control so as to produce a third path among the paths according to the power management mode (if it is determined that it is not possible to support the direct mode).

In various embodiments, like the example in which the controller 480 determines whether a direct mode is supported, based on the power transmission information (e.g., OTG information) received from the external electronic device 403, the controller 480 may perform control so as to produce at least one of a fourth path and a fifth path, among the paths according to the direct mode, and a sixth path, among the paths according to the power management mode (if it is determined that it is possible to support the direct mode), or may perform control so as to produce a sixth path, among the paths according to the power management mode (if it is determined that it is not possible to support the direct mode).

In various embodiments, the electronic device 401 may be connected to one external electronic device among the external electronic device 402 and the external electronic device 403 (e.g., the external electronic device 402), thereby transmitting a signal for supplying power to the external electronic device (e.g., the external electronic device 402), and may receive a signal for obtaining power from the other external electronic device (e.g., the external electronic device 403).

For example, the controller 480 may receive a signal for wirelessly obtaining power from the external electronic device 402 using a first path, a second path, or a combination thereof, and may transmit a signal for supplying power in a wired manner to the external electronic device 403 using a sixth path by the OTG scheme. As another example, the controller 480 may receive a signal for wirelessly obtaining power from the external electronic device 402 using a third path, and may transmit a signal for supplying power in a wired manner to the external electronic device 403 using a fourth path, a fifth path, or a combination thereof by the OTG scheme. As another example, the controller 480 may transmit a signal for wirelessly supplying power to the external electronic device 402 using a first path, a second path, or a combination thereof, and may receive a signal for obtaining power in a wired manner from the external electronic device 403 using a sixth path. As another example, the controller 480 may transmit a signal for wirelessly supplying power to the external electronic device 402 using a third path, and may receive a signal for obtaining power in a wired manner from the external electronic device 403 using a fourth path, a fifth path, and a combination thereof.

In various embodiments, the controller 480 may make a request to the external electronic device 402 for adjustment of a signal for charging power using an in-band scheme, an out-band scheme, or a combination thereof. In various embodiments, the controller 480 may make a request to the external electronic device 402, the external electronic device 403, or a combination thereof for adjustment of a signal for charging power, based on a data value corresponding to a voltage state, a current state, a temperature state, or a combination thereof of the coil 410, the rectifier circuit 423, the capacitive voltage divider circuit 425, the capacitive voltage divider circuit 440, the power management IC 450, the battery 470, or a combination thereof, which is received from the sensing circuit 460. In various embodiments, the controller 480 may compare a data value from the sensing circuit 460 with a reference range according to the type of data value, thereby making a request to the external electronic device 402, the external electronic device 403, or a combination thereof for adjustment of a signal for charging power. In various embodiments, if a voltage value of the coil 410, the rectifier circuit 423, the capacitive voltage divider circuit 425, the capacitive voltage divider circuit 440, the power management IC 450, the battery 470, or a combination thereof falls outside of a configured voltage range, the controller 480 may make a request to the external electronic device 402 for reducing the voltage value, the current value, or a combination thereof of a signal for charging power. In various embodiments, if a current value of the coil 410, the rectifier circuit 423, the capacitive voltage divider circuit 425, the capacitive voltage divider circuit 440, the power management IC 450, the battery 470, or a combination thereof falls outside of a configured current range, the controller 480 may make a request to the external electronic device 402 for reducing the voltage value, the current value, or a combination thereof of a signal for charging power. In various embodiments, if a temperature value of the coil 410, the rectifier circuit 423, the capacitive voltage divider circuit 425, the capacitive voltage divider circuit 440, the power management IC 450, the battery 470, or a combination thereof falls outside of a configured temperature range, the controller 480 may make a request to the external electronic device 402 for reducing the voltage value, the current value, or a combination thereof of a signal for charging power.

For example, if a data value corresponding to the temperature state of the rectifier circuit 423, which is received from the sensing circuit 460, falls outside of a reference range according to the type of data value, the controller 480 may make a request to the external electronic device 402 for reducing the voltage value, the current value, or a combination thereof of a signal for charging power. As another example, if a data value corresponding to the temperature state of the rectifier circuit 423, which is received from the sensing circuit 460, is less than or equal to a reference range according to the type of data value, the controller 480 may make a request to the external electronic device 402 for increasing the voltage value, the current value, or a combination thereof of a signal for charging power.

In various embodiments, the controller 480 may perform switching between modes, based on a data value corresponding to a voltage state, a current state, a temperature state, or a combination thereof of the coil 410, the rectifier circuit 423, the capacitive voltage divider circuit 425, the capacitive voltage divider circuit 440, the power management IC 450, the battery 470, or a combination thereof, which is received from the sensing circuit 460. In various embodiments, the controller 480 may compare a data value from the sensing circuit 460 with a reference range according to the type of data value, thereby determining whether to switch between modes. In various embodiments, if a voltage value of the coil 410, the rectifier circuit 423, the capacitive voltage divider circuit 425, the capacitive voltage divider circuit 440, the power management IC 450, the battery 470, or a combination thereof falls outside of a configured voltage range, the controller 480 may determine to perform switching between modes. In various embodiments, even in the example where a path according to a direct mode is produced according to the determination that the direct mode is able to be supported, if switching between modes is determined, the controller 480 may perform control so as to switch from a path according to the direct mode to a path according to a power management mode.

In various embodiments, the controller 480 may restrict the voltage, the current, or a combination thereof of a signal for obtaining power, based on a data value corresponding to a voltage state, a current state, a temperature state, or a combination thereof of the coil 410, the rectifier circuit 423, the capacitive voltage divider circuit 425, the capacitive voltage divider circuit 440, the power management IC 450, the battery 470, or a combination thereof, which is received from the sensing circuit 460. In various embodiments, the controller 480 may compare a data value from the sensing circuit 460 with a reference range according to the type of data value, thereby restricting the voltage, the current, or combination thereof of a signal for obtaining power.

The electronic device 401 according to various embodiments may determine whether a direct mode is supported, based on power transmission information or identification information, which is received from an external electronic device, data values from the sensing circuit 460, or a combination thereof. The electronic device 401 according to various embodiments may execute a direct mode if it is determined that it is possible to support the direct mode, based on power transmission information or identification information, which is received from an external electronic device, data values from the sensing circuit 460, or a combination thereof. For example, in determining whether to support the direct mode, based on the power transmission information received from an external electronic device, data values from the sensing circuit 460, or a combination thereof, if it is determined that it is possible to support the direct mode, based on the power transmission information, and if it is determined that it is possible to support the direct mode, based on the data value from the sensing circuit 460, the electronic device 401 may execute the direct mode. However, the disclosure is not limited thereto. According to various embodiments, the electronic device 401 may execute a direct mode if it is determined that it is possible to support the direct mode, based on power transmission information or identification information, which is received from an external electronic device, data values from the sensing circuit 460, or a combination thereof. The electronic device 401 according to various embodiments may determine that support of the direct mode is possible even while maintaining the direct mode, the power management mode, or a combination thereof. The electronic device 401 according to various embodiments may determine whether a direct mode is supported if a configured criterion (e.g., a configured time interval) is satisfied.

As described above, the electronic device 401 according to various embodiments is able to minimize and/or reduce power loss due to adjustment of the voltage, the current, or a combination thereof of an external power signal, which is performed by the power management IC of the electronic device, by adjusting the voltage and current of the external power signal and determining a power supply path such that a power signal having a voltage and current suitable for the battery is supplied to the battery.

Figure 4B:
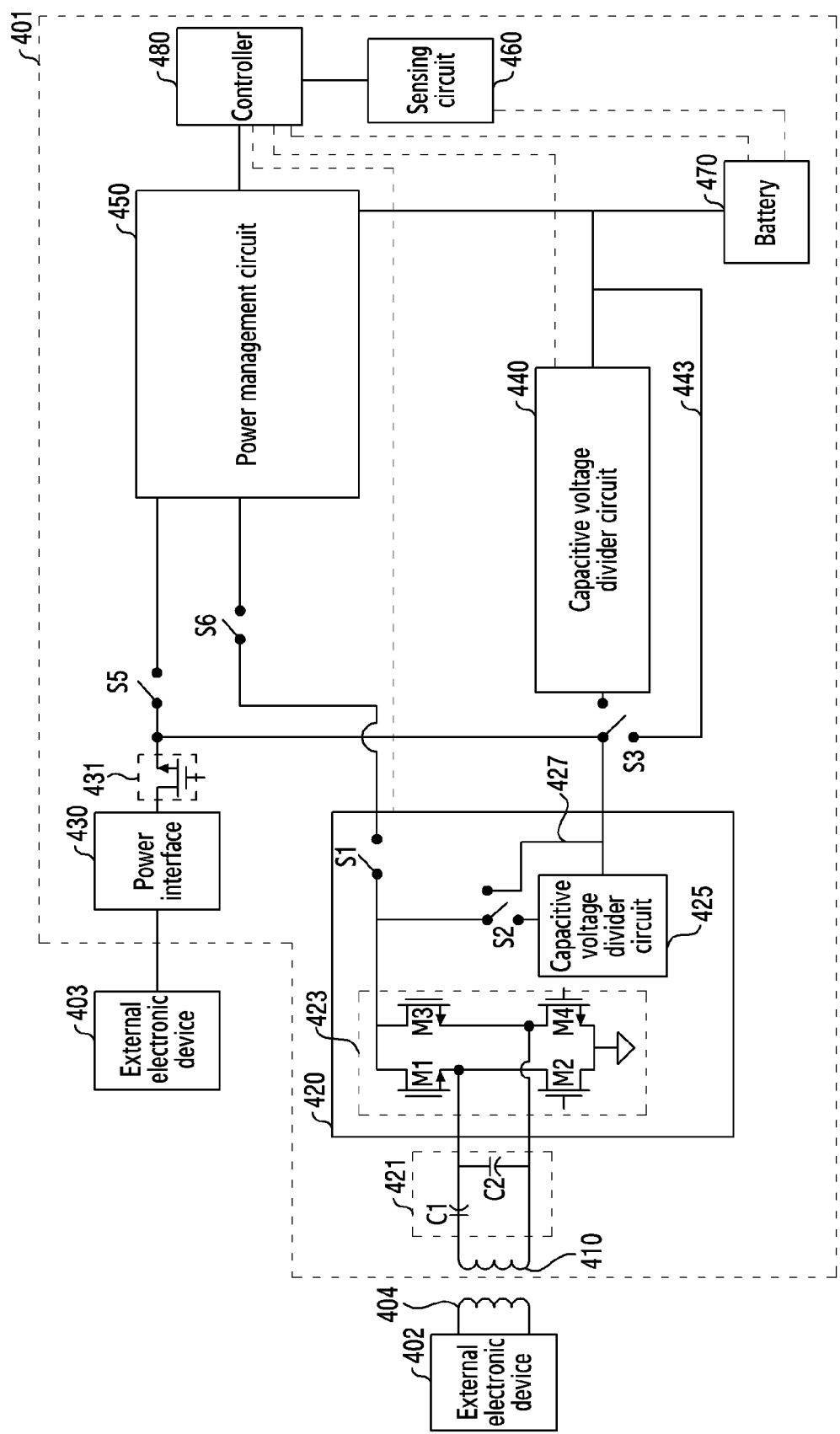
FIG. 4B is a diagram illustrating an example functional configuration of an electronic device according to various embodiments.

FIG. 4B is a diagram illustrating an example functional configuration of an electronic device 401 according to various embodiments. Such a functional configuration may be included in the electronic device 101 shown in FIG. 1, the electronic device 202 shown in FIG. 2, or the electronic device 301 shown in FIG. 3.

Referring to FIG. 4B, the electronic device 401 may include a coil 410, a wireless charging circuit 420, a matching circuit 421, a power interface 430, an overvoltage protection (OVP) switch 431, a capacitive voltage divider circuit 440, a bypass circuit 443, a power management IC (PMIC) 450, a sensing circuit 460, a battery 470, a controller 480, or a combination thereof. Since the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, or the controller 480 shown in FIG. 4B correspond to the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, or the controller 480 shown in FIG. 4A, a description thereof will not be repeated here.

Referring to FIG. 4B, the wireless charging circuit 420 may include the rectifier circuit 423, the switch S1, the switch S2, the capacitive voltage divider circuit 425, the bypass circuit 427, or a combination thereof. In various embodiments, the wireless charging circuit 420 may include an LDO (not shown). The LDO (not shown) of the wireless charging circuit 420 may be connected to the rectifier circuit 423, thereby receiving a DC signal output from the rectifier circuit 423. The LDO (not shown) of the wireless charging circuit 420 may be connected to the switch S1, the switch S2, or a combination thereof, thereby transmitting a DC signal received from the rectifier circuit 423 to the switch S1, the switch S2, or a combination thereof. However, the disclosure is not limited thereto. In various embodiments, the wireless charging circuit 420 may include a first LDO (not shown) that is connected to the switch S1 and the rectifier circuit 423 so as to transmit a DC signal received from the rectifier circuit 423 to the switch S1. In various embodiments, a second LDO (not shown) connected to the switch S2 and the rectifier circuit 423 so as to transmit a DC signal received from the rectifier circuit 423 to the switch S2 may be included. However, the disclosure is not limited thereto. In various embodiments, the switches (S1, S2, S3, S4, S5, S6, or a combination thereof) may be integrated with the LDO, thereby performing a low-dropout function.

In various embodiments, the controller 480 may control the on/off states of the switches (S1, S2, S3, S5, S6, or a combination thereof), thereby producing a path between the coil 410 and the battery 470 or producing a path between the power interface 430 and the battery 470. In various embodiments, the controller 480 may be connected to the switches (S1, S2, S3, S5, S6, or a combination thereof), thereby directly controlling the on/off states of the switches (S1, S2, S3, S5, S6, or a combination thereof). In various embodiments, the controller 480 may be connected to the switches S1 and S2 through the wireless power circuit 420 so as to transmit a control command for controlling the on/off states of the switches S1 and S2, thereby controlling the on/off states of the switches S1 and S2. In various embodiments, the controller 480 may perform control so as to produce paths according to a direct mode, or may perform control so as to produce paths according to a power management mode. Control by the controller 480 of the switches (S1, S2, S3, S5, S6, or a combination thereof) to produce the paths according to the direct mode and the paths according to the power management mode may be expressed as shown, for example, in Table 2 below.

TABLE 2

| | S1 | S2 | S3 | S4 | S6 |
|---|---|---|---|---|---|
| Seventh path | off state | first on state | second on state | don't care | don't care |
| Eighth path | off state | second on state | second on state | don't care | don't care |
| Ninth path | off state | first on state | first on state | don't care | don't care |
| Tenth path | off state | second on state | first on state | don't care | don't care |
| Eleventh path | on state | off state | don't care | off state | on state |
| Twelfth path | don't care | off state | first on state | off state | don't care |
| Thirteenth path | don't care | off state | second on state | off state | don't care |
| Fourteenth path | don't care | don't care | off state | on state | off state |

As shown in Table 2, the controller 480 may perform control such that the switches (S1, S2, S3, S5, S6, or a combination thereof) are in one of an on state and an off state. In various embodiments, the controller 480 may perform control such that the switches indicated as "don't care" in Table 2 are in an off state. For example, in the control of the on/off states of the switches (S1, S2, S3, S5, S6, or a combination thereof) for producing an eleventh path, the controller 480 may perform control such that the switch S3 are in an off state. However, the disclosure is not limited thereto. In various embodiments, the controller 480 may perform control such that the switches indicated as "don't care" in Table 2 are in an on state. For example, in order to produce an eleventh path and a twelfth path, the controller 480 may control the on/off states of the switches (S1, S2, S3, S5, S6, or a combination thereof) such that the switches S1 and S6 are in an on state, the switches S2 and S5 are in an off state, the switch S3 is in a first on state, and the switch S5 is in an on state.

As shown in Table 2, in order to produce a seventh path, the controller 480 may perform control so as to convert the switch S1 to an off state, may perform control so as to convert the switch S2 to a first on state, and may perform control so as to convert the switch S3 to a second on state. In various embodiments, while the switch S3 is in an on state (a first on state or a second on state), the overvoltage protection (OVP) switch 431 may be controlled so as to be in an off state in order to prevent a signal from being transmitted to the power interface. In various embodiments, an additional switch (not shown) for electrically connecting the overvoltage protection (OVP) switch 431 to the switch S3 may be further included. In various embodiments, the additional switch (not shown) may be turned off in order to prevent a signal from being transmitted to the power interface while the switch S3 is in an on state (a first on state or a second on state).

In addition, as shown in Table 2, in order to produce an eighth path, the controller 480 may perform control so as to convert the switch S1 to an off state, may perform control so as to convert the switch S2 to a second on state, and may perform control so as to convert the switch S3 to a second on state.

In addition, as shown in Table 2, in order to produce a ninth path, the controller 480 may perform control so as to convert the switch S1 to an off state, may perform control so as to convert the switch S2 to a first on state, and may perform control so as to convert the switch S3 to a first on state.

In addition, as shown in Table 2, in order to produce a tenth path, the controller 480 may perform control so as to convert the switch S1 to an off state, may perform control so as to convert the switch S2 to a second on state, and may perform control so as to convert the switch S3 to a first on state.

In addition, as shown in Table 2, in order to produce an eleventh path, the controller 480 may perform control so as to convert the switch S1 and the switch S6 to an on state, and may perform control so as to convert the switch S2 and the switch S5 to an off state. In various embodiments, in order to produce a third path, the controller 480 may perform control so as to convert the switch S2, the switch S3, or a combination thereof, instead of the switch S2, to an off state.

In addition, as shown in Table 2, in order to produce a twelfth path, the controller 480 may perform control so as to convert the switch S3 and the switch S5 to an off state, and may perform control so as to convert the switch S3 to a first on state. In various embodiments, in order to produce a twelfth path, the controller 480 may perform control so as to convert the switch S3, the switch S2, or a combination thereof, instead of the switch S3, to an off state.

In addition, as shown in Table 2, in order to produce a thirteenth path, the controller 480 may perform control so as to convert the switch S2 and the switch S5 to an off state, and may perform control so as to convert the switch S3 to a second on state.

In addition, as shown in Table 2, in order to produce a fourteenth path, the controller 480 may perform control so as to convert the switches S3 and S6 to an off state, and may perform control so as to convert the switch S5 to an on state. In various embodiments, in order to produce a fourteenth path, the controller 480 may perform control so as to convert the switch S1, the switch S6, or a combination thereof, instead of the switch S6, to an off state.

The controller 480 may determine whether a direct mode is supported, based on power transmission information or identification information, which is received from an external electronic device. In various embodiments, the controller 480 may determine whether a direct mode is supported, based on a data value corresponding to a voltage state, a current state, a temperature state, or a combination thereof of the coil 410, the rectifier circuit 423, the capacitive voltage divider circuit 425, the capacitive voltage divider circuit 440, the power management IC 450, the power interface 430, the battery 470, or a combination thereof.

In various embodiments, if it is determined that it is possible to support the direct mode, the controller 480 may perform control so as to execute a direct mode, a power management mode, or a combination thereof. In various embodiments, if it is determined that it is possible to support a direct mode, the controller 480 may perform control so as to execute the direct mode. In various embodiments, if it is determined that it is possible to support a direct mode, the controller 480 may perform control so as to execute the direct mode, and may perform control so as to execute a power management mode at the same time. In various embodiments, the controller 480 may perform control so as to execute a power management mode even if it is determined that it is possible to support a direct mode. In various embodiments, if it is determined that it is not possible to support a direct mode, the controller 480 may perform control so as to execute a power management mode.

In various embodiments, the controller 480 may perform control so as to produce a seventh path, an eighth path, a ninth path, a tenth path, a twelfth path, a thirteenth path, or a combination thereof in order to execute a direct mode. In various embodiments, the controller 480 may perform control so as to produce an eleventh path, a fourteenth path, or a combination thereof in order to execute a power management mode. In various embodiments, the controller 480 may perform control so as to produce a seventh path, an eighth path, a ninth path, a tenth path, or a combination thereof in order to connect the external electronic device 402 to the battery 470 in a direct mode. In various embodiments, the controller 480 may perform control so as to produce an eleventh path in order to connect the external electronic device 402 to the battery 470 in a power management mode. In various embodiments, the controller 480 may perform control so as to produce a twelfth path, an thirteenth path, or a combination thereof in order to connect the external electronic device 403 to the battery 470 in a direct mode. In various embodiments, the controller 480 may perform control so as to produce a fourteenth path in order to connect the external electronic device 403 to the battery 470 in a power management mode.

Figure 4C:
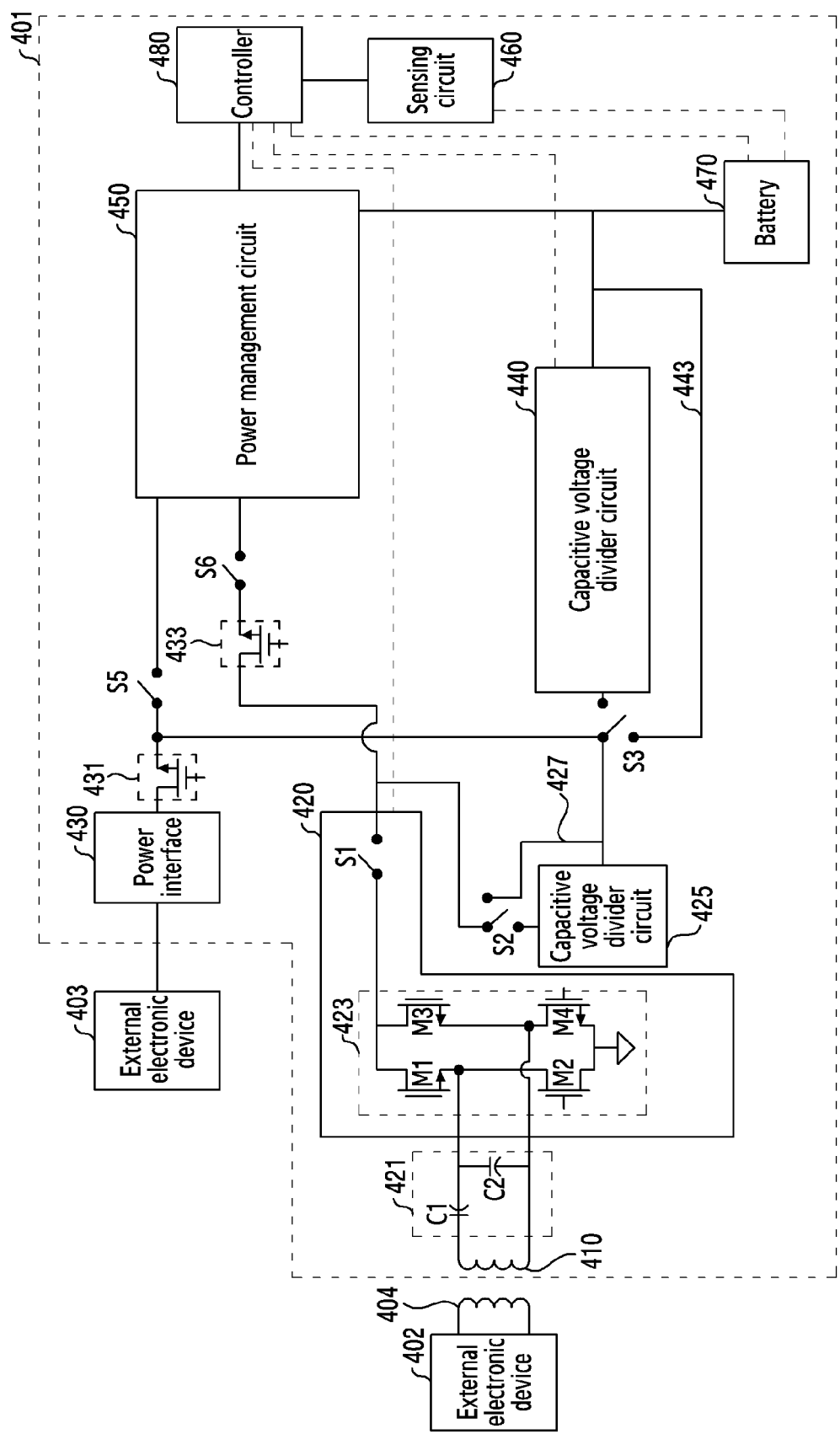
FIG. 4C is a diagram illustrating an example functional configuration of an electronic device according to various embodiments.

FIG. 4C is a diagram illustrating an example functional configuration of an electronic device according to various embodiments. Such a functional configuration may be included in the electronic device 101 shown in FIG. 1, the electronic device 202 shown in FIG. 2, or the electronic device 301 shown in FIG. 3.

Referring to FIG. 4C, the electronic device 401 may include a coil 410, a wireless charging circuit 420, a matching circuit 421, a power interface 430, overvoltage protection (OVP) switches 431 and 433, capacitive voltage divider circuits 440 and 445, bypass circuits 427 and 443, a power management IC (PMIC) 450, a sensing circuit 460, a battery 470, a controller 480, or a combination thereof. Since the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, and the controller 480 shown in FIG. 4C correspond to the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, and the controller 480 shown in FIG. 4A, a description thereof will not be repeated here.

Referring to FIG. 4C, the wireless charging circuit 420 may include the rectifier circuit 423. In various embodiments, the rectifier circuit 423 of the wireless charging circuit 420 may be connected to the switch S1. In various embodiments, the switch S1 may be connected to the power management IC 450, the switch S2, or a combination thereof. In various embodiments, depending on the on/off state of the switch S1, a DC signal output from the rectifier circuit 423 may be transmitted to the power management IC 450, the switch S2, or a combination thereof. In various embodiments, the switch S2 may be connected to the capacitive voltage divider circuit 445, the bypass circuit 427, or a combination thereof, depending on the on/off state of the switch S2. In various embodiments, the rectifier circuit 423 of the wireless charging circuit 420 may be connected to switch S1 through an LDO (not shown). In various embodiments, the switch S1 may include an LDO (not shown). However, the disclosure is not limited thereto. In various embodiments, the switches (S1, S2, S3, S5, S6, or a combination thereof) may be integrated with the LDO, thereby performing a low-dropout function.

Referring to FIG. 4C, the overvoltage protection (OVP) switch 433 may be connected to the switch S1 so as to receive a DC signal from the rectifier circuit 423, and may be opened if the voltage of the received DC signal is greater than or equal to a specified voltage, thereby preventing a voltage greater than or equal to a specified voltage from being applied to the power management IC 450.

In various embodiments, the controller 480 may control the on/off states of the switches (S1, S2, S3, S5, S6, or a combination thereof), thereby producing a path between the coil 410 and the battery 470 or producing a path between the power interface 430 and the battery 470. In various embodiments, the controller 480 may be connected to the switches (S1, S2, S3, S5, S6, or a combination thereof), thereby directly controlling the on/off states of the switches (S1, S2, S3, S5, S6, or a combination thereof). In various embodiments, the controller 480 may perform control so as to produce paths according to a direct mode, or may perform control so as to produce paths according to a power management mode. Control by the controller 480 of the switches (S1, S2, S3, S5, S6, or a combination thereof) to produce the paths according to the direct mode and the paths according to the power management mode may be expressed as shown, for example, in Table 3 below.

TABLE 3

| | S1 | S2 | S3 | S5 | S6 |
|---|---|---|---|---|---|
| Fifteenth path | on state | first on state | second on state | don't care | off state |
| Sixteenth path | on state | second on state | second on state | don't care | off state |
| Seventeenth path | on state | first on state | first on state | don't care | off state |
| Eighteenth path | on state | second on state | first on state | don't care | off state |
| Nineteenth path | on state | off state | don't care | don't care | on state |
| Twentieth path | don't care | off state | first on state | off state | don't care |
| Twenty-first path | don't care | off state | second on state | off state | don't care |
| Twenty-second path | don't care | don't care | off state | on state | off state |

As shown in Table 3, the controller 480 may perform control such that the switches (S1, S2, S3, S5, S6, or a combination thereof) are in one of an on state and an off state. In various embodiments, the controller 480 may perform control such that the switches indicated as "don't care" in Table 3 are in an off state. For example, in the control of the on/off states of the switches (S1, S2, S3, S5, S6, or a combination thereof) for producing a nineteenth path, the controller 480 may perform control such that the switches S3 and S5 are in an off state. However, the disclosure is not limited thereto. In various embodiments, the controller 480 may perform control such that the switches indicated as "don't care" in Table 3 are in an on state. For example, in order to produce a nineteenth path and a twentieth path, the controller 480 may control the on/off states of the switches (S1, S2, S3, S5, S6, or a combination thereof) such that the switches S1 and S6 are in an on state, the switches S2 and S5 are in an off state, and the switch S3 is in a first on state.

In Table 3, the switch S1 and the capacitive voltage divider circuit 445 may be connected to each other in the first on state of the switch S2; the switch S1 and the bypass circuit 427 may be connected to each other in the second on state of the switch S2; and the off state of the switch S2 may indicate an open state.

In various embodiments, if the switch S3 is in an on state (a first on state or a second on state), the overvoltage protection (OVP) switch 431 may be controlled so as to be in an off state in order to prevent a signal from being transmitted to the power interface. In various embodiments, an additional switch (not shown) for electrically connecting the overvoltage protection (OVP) switch 431 and the switch S3 may be further included. In various embodiments, the additional switch (not shown) may be turned off in order to prevent a signal from being transmitted to the power interface while the switch S3 is in an on state (a first on state or a second on state).

The controller 480 may determine whether a direct mode is supported, based on power transmission information or identification information, which is received from an external electronic device. In various embodiments, the controller 480 may determine whether a direct mode is supported, based on a data value corresponding to a voltage state, a current state, a temperature state, or a combination thereof of the coil 410, the rectifier circuit 423, the capacitive voltage divider circuit 425, the capacitive voltage divider circuit 440, the power management IC 450, the power interface 430, the battery 470, or a combination thereof.

In various embodiments, if it is determined that it is possible to support a direct mode, the controller 480 may perform control so as to execute the direct mode, the power management mode, or a combination thereof. In various embodiments, if it is determined that it is possible to support a direct mode, the controller 480 may perform control so as to execute the direct mode. In various embodiments, if it is determined that it is possible to support a direct mode, the controller 480 may perform control so as to execute the direct mode, and may perform control so as to execute a power management mode at the same time. In various embodiments, the controller 480 may perform control so as to execute a power management mode even if it is determined that it is possible to support a direct mode. In various embodiments, if it is determined that it is not possible to support a direct mode, the controller 480 may perform control so as to execute a power management mode.

In various embodiments, the controller 480 may perform control so as to produce a fifteenth path, a sixteenth path, a seventeenth path, an eighteenth path, a twentieth path, a twenty-first path, or a combination thereof in order to execute a direct mode. In various embodiments, the controller 480 may perform control so as to produce a nineteenth path, a twenty-second path, or a combination thereof in order to execute a power management mode. In various embodiments, the controller 480 may perform control so as to produce a fifteenth path, a sixteenth path, a seventeenth path, an eighteenth path, or a combination thereof in order to connect the external electronic device 402 with the battery 470 in a direct mode. In various embodiments, the controller 480 may perform control so as to produce a nineteenth path in order to connect the external electronic device 402 with the battery 470 in a power management mode. In various embodiments, the controller 480 may perform control so as to produce a twentieth path, a twenty-first path, or a combination thereof in order to connect the external electronic device 403 with the battery 470 in a direct mode. In various embodiments, the controller 480 may perform control so as to produce a twenty-second path in order to connect the external electronic device 403 with the battery 470 in a power management mode.

Figure 4D:
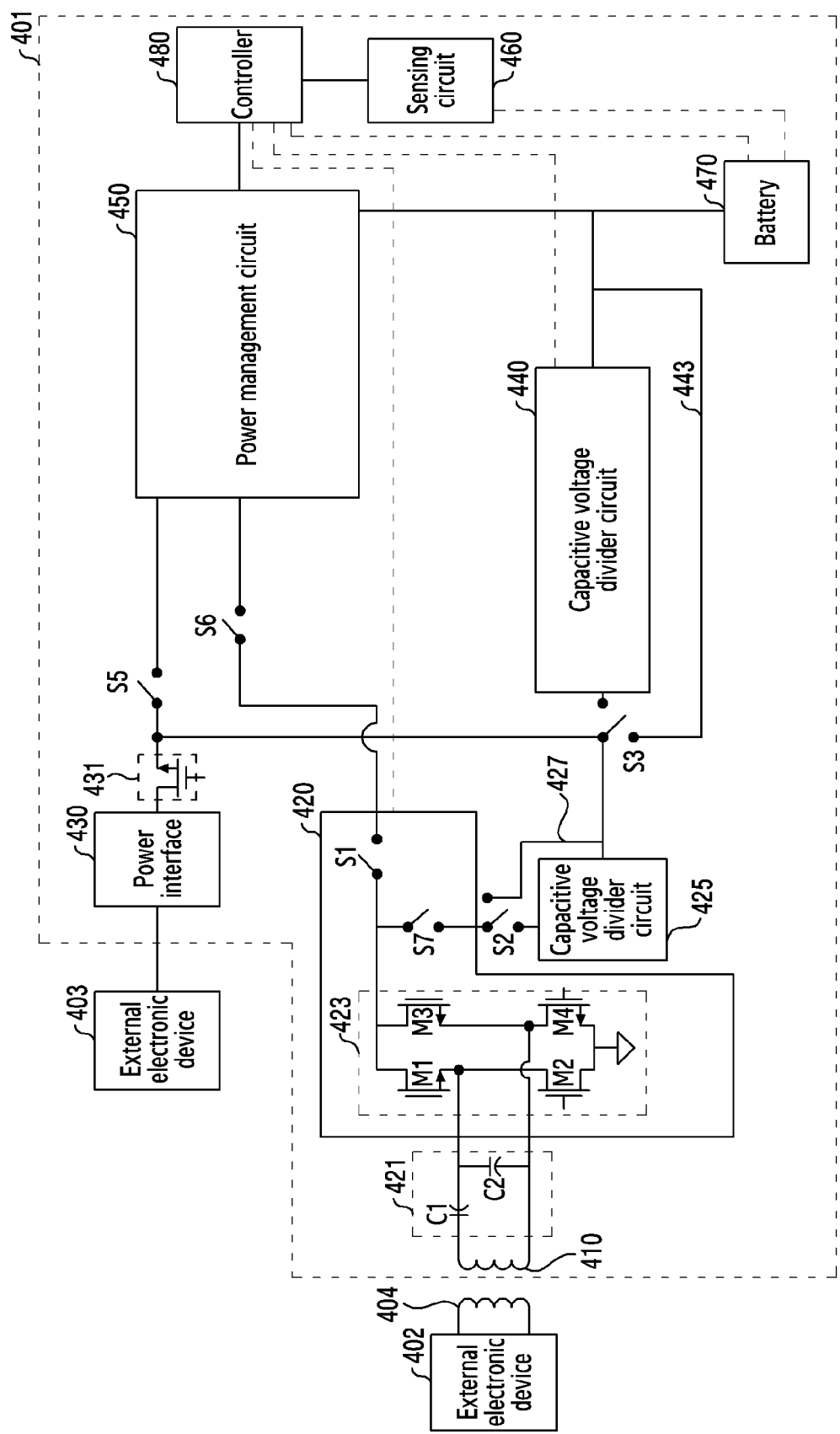
FIG. 4D is a diagram illustrating an example functional configuration of an electronic device according to various embodiments.

FIG. 4D is a diagram illustrating an example functional configuration of an electronic device according to various embodiments. Such a functional configuration may be included in the electronic device 101 shown in FIG. 1, the electronic device 202 shown in FIG. 2, or the electronic device 301 shown in FIG. 3.

Referring to FIG. 4D, the electronic device 401 may include a coil 410, a wireless charging circuit 420, a matching circuit 421, a power interface 430, an overvoltage protection (OVP) switch 431, capacitive voltage divider circuits 440 and 445, bypass circuits 427 and 443, a power management IC (PMIC) 450, a sensing circuit 460, a battery 470, a controller 480, or a combination thereof. Since the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, and the controller 480 shown in FIG. 4D correspond to the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, and the controller 480 shown in FIG. 4A, a description thereof will not be repeated here.

Referring to FIG. 4D, the wireless charging circuit 420 may include the rectifier circuit 423, the switches S1 and S7, or a combination thereof. In various embodiments, the rectifier circuit 423 of the wireless charging circuit 420 may be connected to the switch S1, the switch S7, or a combination thereof. In various embodiments, the switch S1 may be connected to the power management IC 450. In various embodiments, the switch S1 of the wireless charging circuit 420 may be integrated with an LDO, thereby performing a low-dropout function. In various embodiments, the switch S7 of the wireless charging circuit 420 may be integrated with an LDO, thereby performing a low-dropout function. However, the disclosure is not limited thereto. In various embodiments, the switch (S1, S2, S3, S5, S6, S7, or a combination thereof) may be integrated with an LDO, thereby performing a low-dropout function.

In various embodiments, depending on the on/off state of the switch S1, a DC signal output from the rectifier circuit 423 may be transmitted to the power management IC 450. In various embodiments, depending on the on/off state of the switch S7, a DC signal output from the rectifier circuit 423 may be transmitted to the switch S2.

In various embodiments, depending on the on/off state of the switch S2, a DC signal transmitted from the switch S7 may be transmitted to the capacitive voltage divider circuit 445 or the bypass circuit 427. In various embodiments, the switch S1, the switch S2, or a combination thereof may receive a DC signal from the rectifier circuit 423, and may operate as an LDO that is opened if the voltage of the received DC signal is equal to or greater than a specified voltage.

In various embodiments, the controller 480 may control the on/off states of the switches (S1, S2, S3, S5, S6, S7 or a combination thereof), thereby producing a path between the coil 410 and the battery 470 or producing a path between the power interface 430 and the battery 470. In various embodiments, the controller 480 may be connected to the switches (S1, S2, S3, S5, S6, S7, or a combination thereof), thereby directly controlling the on/off states of the switches (S1, S2, S3, S5, S6, S7, or a combination thereof). In various embodiments, the controller 480 may perform control so as to produce paths according to a direct mode, or may perform control so as to produce paths according to a power management mode. In various embodiments, the controller 480 may be connected to the switches S1 and S7 through the wireless power circuit 420 so as to transmit a control command for controlling the on/off states of the switches S1 and S7, thereby controlling the on/off states of the switches S1 and S7. Control by the controller 480 of the switches (S1, S2, S3, S5, S6, S7, or a combination thereof) to produce the paths according to the direct mode and the paths according to the power management mode may be expressed as shown, for example, in Table 4 below.

TABLE 4

| | S1 | S2 | S3 | S5 | S6 | S7 |
|---|---|---|---|---|---|---|
| Twenty-third path | off state | first on state | second on state | don't care | don't care | on state |
| Twenty-fourth path | off state | second on state | second on state | don't care | don't care | on state |
| Twenty-fifth path | off state | first on state | first on state | don't care | don't care | on state |
| Twenty-sixth path | off state | second on state | first on state | don't care | don't care | on state |
| Twenty-seventh path | on state | don't care | don't care | off state | on state | off state |
| Twenty-eighth path | don't care | off state | first on state | off state | don't care | don't care |
| Twenty-ninth path | don't care | off state | second on state | off state | don't care | don't care |
| Thirtieth path | don't care | don't care | off state | on state | off state | don't care |

As shown in Table 4, the controller 480 may perform control such that the switches (S1, S2, S3, S5, S6, S7, or a combination thereof) are in one of an on state and an off state. In various embodiments, the controller 480 may perform control such that the switches indicated as "don't care" in Table 4 are in an off state. For example, in the control of the on/off states of the switches (S1, S2, S3, S5, S6, S7, or a combination thereof) for producing a twenty-seventh path, the controller 480 may perform control such that the switches S2 and S3 is in an off state. However, the disclosure is not limited thereto. In various embodiments, the controller 480 may perform control such that the switches indicated as "don't care" in Table 4 are in an on state. For example, in order to produce a twenty-seventh path and a twenty-eighth path, the controller 480 may control the on/off states of the switches (S1, S2, S3, S5, S6, S7, or a combination thereof) such that the switches S1 and S6 are in an on state, the switches S2, S5 and S7 are in an off state, and the switch S3 is in a first on state.

In Table 4, in order to produce a twenty-third path, a twenty-fourth path, a twenty-fifth path, or a twenty-sixth path, the controller 480 may perform control so as to convert the switch S1, the switch S5, the switch S6, or a combination thereof, instead of the switch S1, to an off state. The controller 480, in order to produce a twenty-seventh path, may perform control so as to convert the switch S2, the switch S3, the switch S7, or a combination thereof, instead of the switch S7, to an off state. The controller 480, in order to produce a twenty-eighth path or a twenty-ninth path, may perform control so as to convert the switch S2, the switch S7, or a combination thereof, instead of the switch S2, to an off state. The controller 480, in order to produce a twenty-eighth path or a twenty-ninth path, may perform control so as to convert the switch S1, the switch S5, or a combination thereof, instead of the switch S5, to an off state.

In various embodiments, if the switch S3 is in an on state (a first on state or a second on state), the overvoltage protection (OVP) switch 431 may be controlled so as to be in an off state in order to prevent a signal from being transmitted to the power interface. In various embodiments, an additional switch (not shown) for electrically connecting the overvoltage protection (OVP) switch 431 and the switch S3 may be further included. In various embodiments, the additional switch (not shown) may be turned off in order to prevent a signal from being transmitted to the power interface while the switch S3 is in an on state (a first on state or a second on state).

The controller 480 may determine whether a direct mode is supported, based on power transmission information or identification information, which is received from an external electronic device. In various embodiments, the controller 480 may determine whether a direct mode is supported, based on a data value corresponding to a voltage state, a current state, a temperature state, or a combination thereof of the coil 410, the rectifier circuit 423, the capacitive voltage divider circuit 425, the capacitive voltage divider circuit 440, the power management IC 450, the power interface 430, the battery 470, or a combination thereof.

In various embodiments, if it is determined that it is possible to support a direct mode, the controller 480 may perform control so as to execute a direct mode, a power management mode, or a combination thereof. In various embodiments, if it is determined that it is possible to support a direct mode, the controller 480 may perform control so as to execute a direct mode. In various embodiments, if it is determined that it is possible to support a direct mode, the controller 480 may perform control so as to execute the direct mode, and may perform control so as to execute a power management mode at the same time. In various embodiments, the controller 480 may perform control so as to execute a power management mode even if it is determined that it is possible to support a direct mode. In various embodiments, if it is determined that it is not possible to support a direct mode, the controller 480 may perform control so as to execute a power management mode.

In various embodiments, the controller 480 may perform control so as to produce a twenty-third path, a twenty-fourth path, a twenty-fifth path, a twenty-sixth path, a twenty-eighth path, a twenty-ninth path, or a combination thereof in order to execute a direct mode. In various embodiments, the controller 480 may perform control so as to produce a twenty-seventh path, a thirtieth path, or a combination thereof in order to execute a power management mode. In various embodiments, the controller 480 may perform control so as to produce a twenty-third path, a twenty-fourth path, a twenty-fifth path, a twenty-sixth path, or a combination thereof in order to connect the external electronic device 402 to the battery 470 in a direct mode. In various embodiments, the controller 480 may perform control so as to produce a twenty-seventh path in order to connect the external electronic device 402 to the battery 470 in a power management mode. In various embodiments, the controller 480 may perform control so as to produce a twenty-eighth path, a twenty-ninth path, or a combination thereof in order to connect the external electronic device 403 to the battery 470 in a direct mode. In various embodiments, the controller 480 may perform control so as to produce a thirtieth path in order to connect the external electronic device 403 to the battery 470 in a power management mode.

Figure 4E:
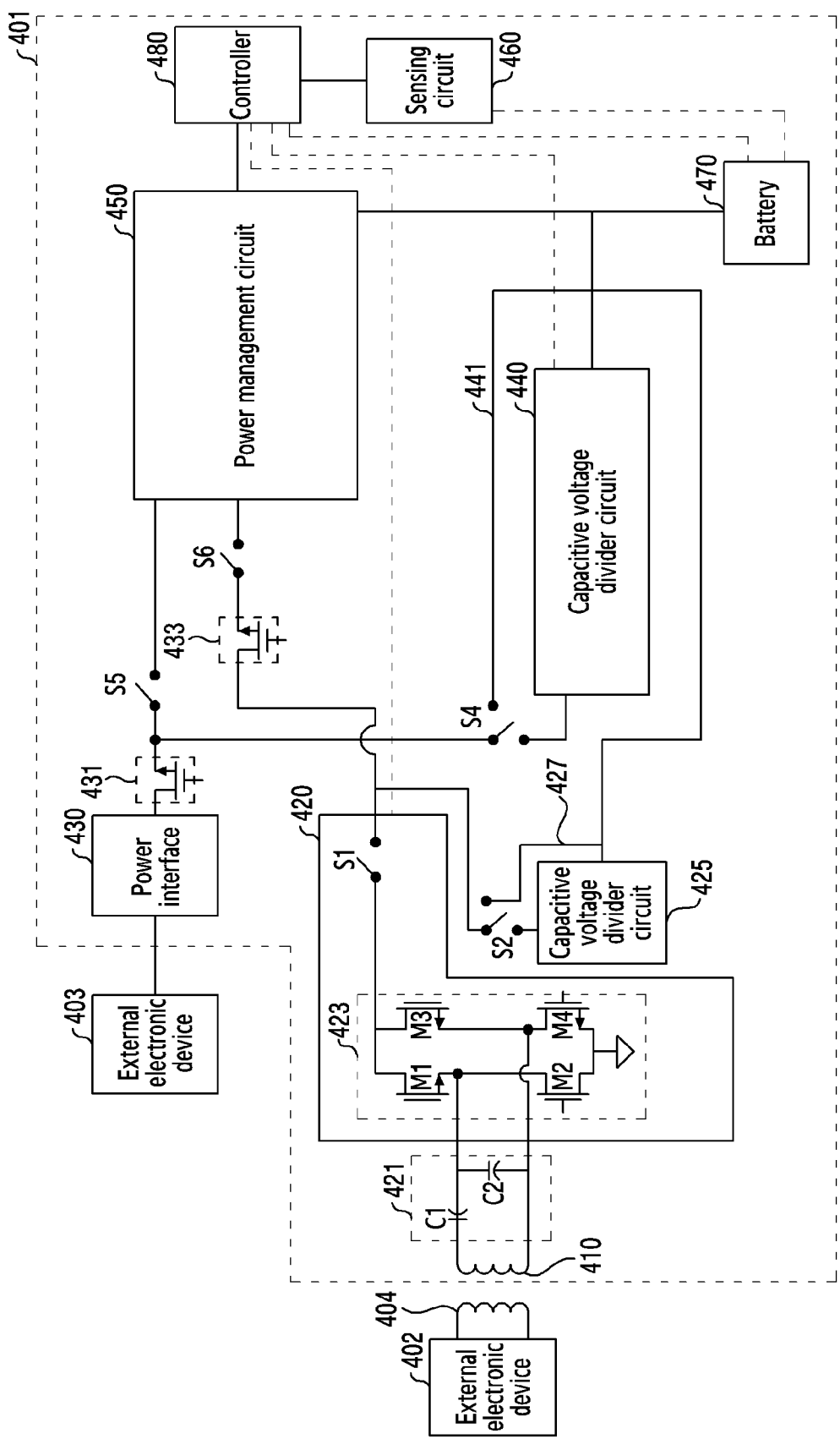
FIG. 4E is a diagram illustrating an example functional configuration of an electronic device according to various embodiments.

FIG. 4E is a diagram illustrating an example functional configuration of an electronic device according to various embodiments. Such a functional configuration may be included in the electronic device 101 shown in FIG. 1, the electronic device 202 shown in FIG. 2, or the electronic device 301 shown in FIG. 3.

Referring to FIG. 4E, the electronic device 401 may include a coil 410, a wireless charging circuit 420, a matching circuit 421, a power interface 430, overvoltage protection (OVP) switches 431 and 433, capacitive voltage divider circuits 440 and 445, bypass circuits 427 and 441, a power management IC (PMIC) 450, a sensing circuit 460, a battery 470, a controller 480, or a combination thereof. Since the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, and the controller 480 shown in FIG. 4E correspond to the functions of the coil 410, the power interface 430, the overvoltage protection (OVP) switch 431, the capacitive voltage divider circuit 440, the bypass circuit 443, the power management IC (PMIC) 450, the sensing circuit 460, the battery 470, and the controller 480 shown in FIG. 4A, a description thereof will not be repeated here.

Referring to FIG. 4E, the wireless charging circuit 420 may include the rectifier circuit 423, the switch S1, or a combination thereof. In various embodiments, the rectifier circuit 423 of the wireless charging circuit 420 may be connected to the switch S1. In various embodiments, the switch S1 may be connected to the power management IC 450, the switch S2, or a combination thereof. In various embodiments, depending on the on/off state of the switch S1, a DC signal output from the rectifier circuit 423 may be transmitted to the power management IC 450, the switch S2, or a combination thereof. In various embodiments, the switch S2 may be connected to the capacitive voltage divider circuit 445 or the bypass circuit 427 depending on the on/off state of the switch S2. In various embodiments, the rectifier circuit 423 of the wireless charging circuit 420 may be connected to the switch S1 through an LDO (not shown). In various embodiments, the switch S1 may be integrated with the LDO, thereby performing a low-dropout function. However, the disclosure is not limited thereto. In various embodiments, the switches (S1, S2, S3, S4, S5, and S6, or a combination thereof) may be integrated with the LDO, thereby performing a low-dropout function.

Referring to FIG. 4E, the capacitive voltage divider circuit 445 may be connected to the wireless charging circuit 420 through the switch S2, and may transmit a DC signal received from the wireless charging circuit 420 to the battery 470. In various embodiments, the bypass circuit 427 may be connected to the wireless charging circuit 420 through the switch S2, and may transmit a DC signal received from the wireless charging circuit 420 to the battery 470.

Referring to FIG. 4E, the overvoltage protection (OVP) switch 433 may be connected to the switch S1 so as to receive a DC signal from the rectifier circuit 423, and may be opened if the voltage of the received DC signal is greater than or equal to a specified voltage, thereby preventing a voltage greater than or equal to a specified voltage from being applied to the power management IC 450.

In various embodiments, the controller 480 may control the on/off states of the switches (S1, S2, S4, S5, S6, or a combination thereof), thereby producing a path between the coil 410 and the battery 470 or producing a path between the power interface 430 and the battery 470. In various embodiments, the controller 480 may be connected to the switches (S1, S2, S4, S5, S6, or a combination thereof), thereby directly controlling the on/off states of the switches (S1, S2, S4, S5, S6, or a combination thereof). In various embodiments, the controller 480 may perform control so as to produce paths according to a direct mode, or may perform control so as to produce paths according to a power management mode. Control by the controller 480 of the switches (S1, S2, S4, S5, S6, or a combination thereof) to produce the paths according to the direct mode and the paths according to the power management mode may be expressed as shown, for example, in Table 5 below.

TABLE 5

|  | S1 | S2 | S4 | S5 | S6 |
| --- | --- | --- | --- | --- | --- |
| Thirty-first path | on state | first on state | off state | don't care | off state |
| Thirty-second path | on state | second on state | off state | don't care | off state |
| Thirty-third path | on state | off state | don't care | off state | on state |
| Thirty-fourth path | don't care | off state | first on state | off state | don't care |
| Thirty-fifth path | don't care | off state | second on state | off state | don't care |
| Thirty-sixth path | don't care | don't care | off state | on state | off state |

As shown in Table 5, the controller 480 may perform control such that the switches (S1, S2, S4, S5, S6, or a combination thereof) are in one of an on state and an off state. In various embodiments, the controller 480 may perform control such that the switches indicated as "don't care" in Table 5 are in an off state. For example, in the control of the on/off states of the switches (S1, S2, S4, S5, S6, or a combination thereof) for producing a thirty-third path, the controller 480 may perform control such that the switch S4 is in an off state. However, the disclosure is not limited thereto. In various embodiments, the controller 480 may perform control such that the switches indicated as "don't care" in Table 5 are in an on state. For example, in order to produce a thirty-third path and a thirty-fourth path, the controller 480 may control the on/off states of the switches (S1, S2, S4, S5, S6, or a combination thereof) such that the switches S1 and S6 are in an on state, the switches S2 and S5 are in an off state, and the switch S4 is in a first on state.

In Table 5, the rectifier circuit 423 and the switch S2 may be connected to each other in the first on state of the switch S1; the rectifier circuit 423 and the power management IC 450 may be connected to each other in the second on state of the switch S1; and the off state of the switch S1 may indicate an open state.

The controller 480 may determine whether a direct mode is supported, based on power transmission information, identification information, or a combination thereof, which is received from an external electronic device. In various embodiments, the controller 480 may determine whether a direct mode is supported, based on a data value corresponding to a voltage state, a current state, a temperature state, or a combination thereof of the coil 410, the rectifier circuit 423, the capacitive voltage divider circuit 425, the capacitive voltage divider circuit 440, the power management IC 450, the power interface 430, the battery 470, or a combination thereof.

In various embodiments, if it is determined that it is possible to support a direct mode, the controller 480 may perform control so as to execute a direct mode, a power management mode, or a combination thereof. In various embodiments, if it is determined that it is possible to support a direct mode, the controller 480 may perform control so as to execute the direct mode. In various embodiments, if it is determined that it is possible to support a direct mode, the controller 480 may perform control so as to execute the direct mode, and may perform control so as to execute a power management mode at the same time. In various embodiments, the controller 480 may perform control so as to execute a power management mode even if it is determined that it is possible to support a direct mode. In various embodiments, if it is determined that it is not possible to support a direct mode, the controller 480 may perform control so as to execute a power management mode.

In various embodiments, the controller 480 may perform control so as to produce a thirty-first path, a thirty-second path, a thirty-fourth path, a thirty-fifth path, or a combination thereof in order to execute a direct mode. In various embodiments, the controller 480 may perform control so as to produce a thirty-third path, a thirty-sixth path, or a combination thereof in order to execute a power management mode. In various embodiments, the controller 480 may perform control so as to produce a thirty-first path, a thirty-second path, or a combination thereof in order to connect the external electronic device 402 to the battery 470 in a direct mode. In various embodiments, the controller 480 may perform control so as to produce a thirty-third path in order to connect the external electronic device 402 to the battery 470 in a power management mode. In various embodiments, the controller 480 may perform control so as to produce a thirty-fourth path, a thirty-fifth path, or a combination thereof in order to connect the external electronic device 403 to the battery 470 in a direct mode. In various embodiments, the controller 480 may perform control so as to produce a thirty-sixth path in order to connect the external electronic device 403 to the battery 470 in a power management mode.

An electronic device (e.g., the electronic device 402) according to various example embodiments as described above may include: a battery; a coil configured to receive a signal for wirelessly obtaining power from an external electronic device; a rectifier circuit configured to output the signal received by the coil as a DC signal; a first capacitive voltage divider circuit configured to adjust the voltage of, and output, a signal according to a first voltage division ratio; a second capacitive voltage divider circuit configured to adjust the voltage of, and output, a signal according to a second voltage division ratio; and a controller operatively connected to the battery, the rectifier circuit, the first capacitive voltage divider circuit, and the second capacitive voltage divider circuit, wherein the controller may be configured to control the electronic device to: provide the DC signal to at least one capacitive voltage divider circuit among the first capacitive voltage divider circuit and the second capacitive voltage divider circuit, based on the voltage value of the signal received through the coil, and wherein the battery may be configured to receive another signal output from the at least one capacitive voltage divider circuit, based on the provided DC signal, thereby obtaining power.

In various example embodiments, if the voltage value of the signal received through the coil falls within a reference voltage range, the DC signal may be provided to the first capacitive voltage divider circuit.

In various example embodiments, the electronic device may further include: a bypass circuit for the second capacitive voltage divider circuit; and a switch connected to the first capacitive voltage divider circuit and configured to selectively connect one of the second capacitive voltage divider circuit and the bypass circuit, wherein the rectifier circuit may be connected to the switch through the first capacitive voltage divider circuit, wherein, based on the output voltage of the rectifier circuit falling within another reference voltage range, the controller may be configured to control the electronic device to connect the first capacitive voltage divider circuit to the bypass circuit through the switch such that the battery obtains another signal output from the first capacitive voltage divider circuit, and wherein, based on the output voltage of the rectifier circuit falling outside of another reference voltage range, the controller may be configured to control the electronic device to connect the first capacitive voltage divider circuit to the second capacitive voltage divider circuit through the switch such that the battery obtains another signal output from the second capacitive voltage divider circuit.

In various example embodiments, the electronic device may further include: a bypass circuit for the second capacitive voltage divider circuit; and a switch connected to the rectifier circuit and configured to selectively connect one of the second capacitive voltage divider circuit and the bypass circuit, wherein the first capacitive voltage divider circuit may be connected to the second capacitive voltage divider circuit and the bypass circuit, wherein, based on the output voltage of the rectifier circuit falling within another reference voltage range, the controller may be configured to control the electronic device to connect the rectifier circuit to the bypass circuit through the switch such that the DC signal is provided to the first capacitive voltage divider circuit through the bypass circuit, and wherein, based on the output voltage of the rectifier circuit falling outside of another reference voltage range, the controller may be configured to control the electronic device to connect the second capacitive voltage divider circuit to the bypass circuit through the switch such that the DC signal is provided to the first capacitive voltage divider circuit through the second capacitive voltage divider circuit.

In various example embodiments, the controller may be configured to control the electronic device to provide the DC signal to the first capacitive voltage divider circuit and provide a signal output from the first capacitive voltage divider circuit to the second capacitive voltage divider circuit based on the output voltage of the rectifier circuit falling within another reference voltage range, and the battery may be configured to receive another signal output from the second capacitive voltage divider circuit, thereby obtaining power.

In various example embodiments, the controller may be configured to control the electronic device to produce data for configuring a signal for wirelessly obtaining power transmitted by the external electronic device, based on at least one of a battery voltage of the battery and a temperature of the rectifier circuit and transmit the produced data to the external electronic device.

In various example embodiments, the controller may be configured to control the electronic device to produce data for configuring a signal for wirelessly obtaining power, based on the temperature of the at least one capacitive voltage divider circuit provided with the DC signal and transmit the produced data to the external electronic device.

In various example embodiments, the controller may be configured to control the electronic device to provide the DC signal to the other capacitive voltage divider circuit based on a temperature of the at least one capacitive voltage divider circuit provided with the DC signal falling outside a reference temperature range.

In various example embodiments, an electronic device (e.g., the electronic device 402) according to various embodiments as described above may include: a battery; a coil configured to transmit and/or receive a signal for wirelessly providing power to and obtaining power from an external electronic device; a wireless charging circuit configured to output the signal for wirelessly obtaining power received by the coil from the external electronic device, as a DC signal; a capacitive voltage divider circuit electrically connected to the wireless charging circuit and the battery and configured to adjust the voltage of, and to output, a signal according to a voltage division ratio; a power management integrated circuit electrically connected to the wireless charging circuit and the battery and configured to adjust the voltage of, and to output, a signal, based on power output information configured in the battery; and a controller operatively connected to the wireless charging circuit, the capacitive voltage divider circuit, and the power management integrated circuit, wherein the controller may be configured to control the electronic device to provide the DC signal to at least one circuit of the capacitive voltage divider circuit or the power management integrated circuit (PMIC), based on the voltage value of the signal received through the coil, and wherein the battery may be configured to receive another signal output from the at least one circuit, based on the provided DC signal, thereby obtaining power.

In various example embodiments, the controller may be configured to control the electronic device to provide the DC signal to the capacitive voltage divider circuit based on the voltage value of the signal received through the coil falling within a reference voltage range.

In various example embodiments, the controller may be configured to control the electronic device to provide the DC signal to the power management integrated circuit (PMIC) based on the voltage value of the signal received through the coil falling within a reference voltage range.

In various example embodiments, the controller may be configured to control the electronic device to provide the DC signal to the capacitive voltage divider circuit and the power management integrated circuit (PMIC) based on the voltage value of the signal received through the coil falling within a reference voltage range.

In various example embodiments, the controller may be configured to control the electronic device to produce data for configuring a signal for wirelessly obtaining power transmitted by the external electronic device, based on a temperature of the circuit provided with the DC signal, among the capacitive voltage divider circuit and the power management integrated circuit (PMIC) and transmit the produced data to the external electronic device.

In various example embodiments, the controller may be configured to control the electronic device to provide the DC signal to the other circuit that is not provided with the DC signal, among the capacitive voltage divider circuit and the power management integrated circuit (PMIC), based on the temperature of the circuit provided with the DC signal, among the capacitive voltage divider circuit and the power management integrated circuit (PMIC), falling outside of a reference temperature range.

In various example embodiments, the electronic device may further include a power interface configured to transmit and receive a signal for obtaining power in a wired manner from another external electronic device and configured to be connected to the capacitive voltage divider circuit and the power management integrated circuit, wherein the controller may be configured to control the electronic device to provide a signal for obtaining power in a wired manner from the another external electronic device to the other circuit that is not provided with the DC signal, among the capacitive voltage divider circuit and the power management integrated circuit (PMIC).

In various example embodiments, the controller may be configured to control the electronic device to produce data for configuring a signal for obtaining power in a wired manner transmitted by the another external electronic device, based on a temperature of the power interface and transmit the produced data to the another external electronic device.

In various example embodiments, the controller may be configured to control the electronic device to receive a signal for obtaining power from one external electronic device of the external electronic device or the another external electronic device and transmit a signal for obtaining power to the other external electronic device thereof.

In various example embodiments, the one external electronic device may be the external electronic device, and the other external electronic device may be the another external electronic device.

In various example embodiments, the one external electronic device may be the another external electronic device, and the other external electronic device may be the external electronic device.

In various example embodiments, an electronic device (e.g., the electronic device 402) according to various embodiments as described above may include: a coil configured to receive a wireless power signal from an external electronic device; a wireless power reception circuit electrically connected to the coil; a first voltage divider circuit electrically connected to the wireless power reception circuit; a second voltage divider circuit electrically connected to the first voltage divider circuit and a battery; a charging circuit configured to supply wireless power input from the wireless power reception circuit to the battery; and a controller, wherein the controller may be configured to control the electronic device to: receive identification information of the external electronic device; based on the identification information satisfying a specified condition, provide the received wireless power to the battery using at least one of the first voltage divider circuit or the second voltage divider circuit, and compare a voltage rectified by the power reception circuit with a battery voltage, thereby transmitting configuration or response data for the wireless power signal to the external electronic device; and, based on the identification information not satisfying a specified condition, charge the battery with the received wireless power using the charging circuit.

In various example embodiments, the controller may be configured to control the electronic device to determine that the identification information satisfies a specified condition based on the maximum voltage value of a wireless power signal transmitted by the external electronic device, which is contained in the identification information, falling within a specified voltage range.

In various example embodiments, the controller may be configured to control the electronic device to transmit, to the external electronic device, configuration data instructing to reduce the output of the wireless power signal based on a difference value between a rectified voltage and a battery voltage being less than a configured reference difference value.

In various example embodiments, the controller may be configured to control the electronic device to transmit, to the external electronic device, configuration data instructing to increase the output of the wireless power signal based on a difference value between a rectified voltage and a battery voltage exceeding a reference difference value.

In various example embodiments, the controller may be configured to control the electronic device to supply the received wireless power to the battery using the first voltage divider circuit and the second voltage divider circuit based on a difference value between a rectified voltage and a battery voltage exceeding a configured reference difference value.

An electronic device (e.g., the electronic device 402) according to various example embodiments as described above may include: a coil configured to receive a wireless power signal from a first external electronic device; a wireless power reception circuit electrically connected to the coil; a first voltage divider circuit electrically connected to the wireless power reception circuit; a second voltage divider circuit electrically connected to the first voltage divider circuit and a battery; a power input circuit configured to receive a wired power signal from a second external electronic device; a charging circuit configured to supply power received from the wireless power reception circuit or the power input circuit to the battery; and a controller, wherein the controller may be configured to control the electronic device to supply a received wireless power to the battery using at least one of the first voltage divider circuit and the second voltage divider circuit and supply a received wired power to the battery using the charging circuit.

In various example embodiments, the controller may be configured to control the electronic device to supply the received wireless power to the battery using at least one of the first voltage divider circuit or the second voltage divider circuit, based on a voltage value of the wireless power signal received from the first external electronic device.

In various example embodiments, the controller may be configured to control the electronic device to supply the received wireless power to the battery using at least one of the first voltage divider circuit or the second voltage divider circuit based on a voltage value of the wireless power signal received from the first external electronic device falling within a configured reference voltage range.

In various example embodiments, the controller may be configured to control the electronic device to supply the received wireless power to the battery using the first voltage divider circuit and the second voltage divider circuit based on a voltage value of the wireless power signal received from the first external electronic device falling within a configured reference voltage range.

In various example embodiments, the power input circuit may be configured to be connected to the first voltage divider circuit; the charging circuit may be configured to be connected to the wireless power reception circuit; and the controller may be configured to control the electronic device to supply a received wired power to a battery using at least one of the first voltage divider circuit or the second voltage divider circuit and supply a received wireless power to a battery using the charging circuit.

An electronic device (e.g., the electronic device 402) according to various example embodiments as described above may include: a battery; a coil configured to receive a first signal for wirelessly obtaining power from a first external electronic device; a rectifier circuit configured to output the signal received by the coil as a first DC signal; a power input circuit configured to receive a second DC signal in a wired manner from a second external electronic device; a capacitive voltage divider circuit electrically connected to the rectifier circuit and the power input circuit and configured to charge the battery by adjusting the voltage of a signal according to a voltage division ratio; and a controller operatively connected to the rectifier circuit, the power input circuit, and the capacitive voltage divider circuit, wherein the controller may be configured to control the electronic device to provide at least one of the first DC signal or the second DC signal to the capacitive voltage divider circuit, and wherein the battery may be configured to receive an output signal output from the capacitive voltage divider circuit.

In various example embodiments, the electronic device may further include an additional capacitive voltage divider circuit electrically connected to the rectifier circuit and configured to charge the battery by adjusting the voltage of a signal according to a voltage division ratio, wherein the controller may be configured to control the electronic device to perform control such that the first DC signal is supplied to the additional capacitive voltage divider circuit and a signal output from the additional capacitive voltage divider circuit is supplied to the capacitive voltage divider circuit In various example embodiments, the electronic device may further include an additional capacitive voltage divider circuit electrically connected to the rectifier circuit and configured to charge the battery by adjusting the voltage of a signal according to a voltage division ratio, wherein the controller may be configured to control the electronic device to perform control such that the first DC signal is supplied to the additional capacitive voltage divider circuit and such that a signal output from the additional capacitive voltage divider circuit is supplied to the battery.

In various example embodiments, the electronic device may further include an additional capacitive voltage divider circuit electrically connected to the rectifier circuit and configured to charge the battery by adjusting the voltage of a signal according to a voltage division ratio, wherein the controller may be configured to control the electronic device to perform control such that the first DC signal is supplied to the additional capacitive voltage divider circuit and such that a signal output from the additional capacitive voltage divider circuit is supplied to the capacitive voltage divider circuit.

In various example embodiments, the electronic device may further include a low-dropout regulator electrically connected to the rectifier circuit and configured to output a voltage of the first DC signal output from the current circuit as a configured voltage or less, wherein the controller may be configured to control the electronic device to perform control such that a signal output from the low-dropout regulator is supplied to the capacitive voltage divider circuit.

In various example embodiments, the electronic device may further include a low-dropout regulator electrically connected to the rectifier circuit and configured to output a voltage of the first DC signal output from the current circuit as a configured voltage or less; and an additional capacitive voltage divider circuit electrically connected to the low-dropout regulator and configured to charge the battery by adjusting the voltage of a signal according to a voltage division ratio, wherein the controller may be configured to control the electronic device to perform control such that a signal output from the low-dropout regulator is supplied to the additional capacitive voltage divider circuit and such that a signal output from the additional capacitive voltage divider circuit is supplied to the battery.

Figure 5:
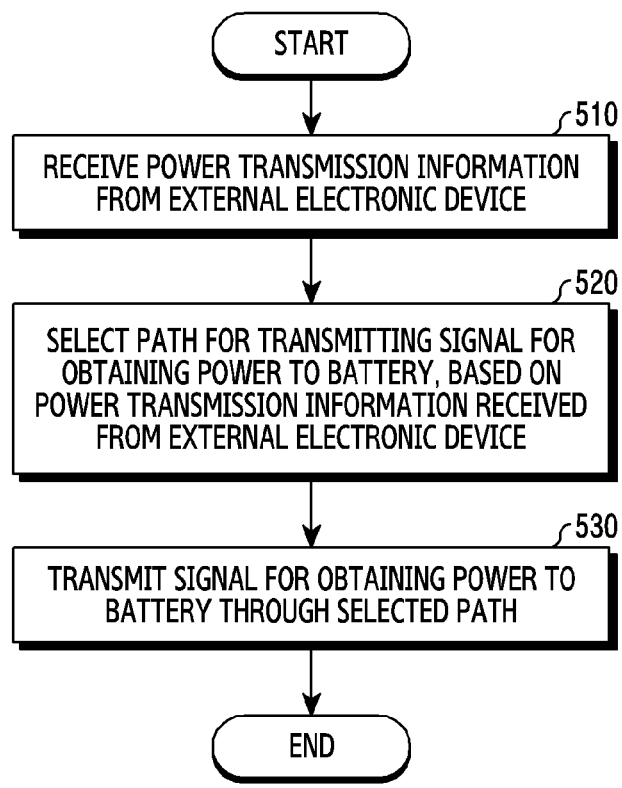
FIG. 5 is a flowchart illustrating an example operation of an electronic device according to various embodiments.

FIG. 5 is a flowchart illustrating an example operation of an electronic device according to various embodiments. This operation may be performed by the electronic device 101 shown in FIG. 1, the electronic device 201 shown in FIG. 2, the electronic device 301 shown in FIG. 3, the electronic device 401 shown in FIG. 4, or the controller 480 of the electronic device 401.

Referring to FIG. 5, the controller 480 may receive power transmission information from an external electronic device in operation 510. In various embodiments, the controller 480 may receive power transmission information from the external electronic device 402, may receive power transmission information from the external electronic device 403, or may receive power transmission information from both the external electronic device 402 and the external electronic device 403.

In operation 520, the controller 480 may control the electronic device to select a path for transmitting a signal for obtaining power to the battery, based on the power transmission information received from the external electronic device. In various embodiments, if the power transmission information is received from the external electronic device 402 in operation 510, the controller 480 may compare the maximum voltage of a signal for obtaining transmittable power, which is contained in the power transmission information received from the external electronic device 402, with a configured voltage range, and may select at least one of a first path to a third path according to the comparison result. In various embodiments, if the power transmission information is received from the external electronic device 403 in operation 510, the controller 480 may compare the maximum voltage of a signal for obtaining transmittable power, which is contained in the power transmission information received from the external electronic device 403, with a configured voltage range, and may select at least one of a fourth path to a sixth path according to the comparison result. In various embodiments, if the power transmission information is received from the external electronic device 402 and the external electronic device 403 in operation 510, the controller 480 may compare the maximum voltage of a signal for obtaining transmittable power, which is contained in the power transmission information received from the external electronic device 402 and the external electronic device 403, with a configured voltage range, and may select at least one of a first path to a third path and at least one of a fourth path to a sixth path according to the comparison result.

In operation 530, the controller 480 may control the electronic device to transmit a signal for obtaining power to the battery through the selected path. In various embodiments, the controller 480 may control the on/off states of the switches S1 to S6 in order to produce the selected path.

Figure 6:
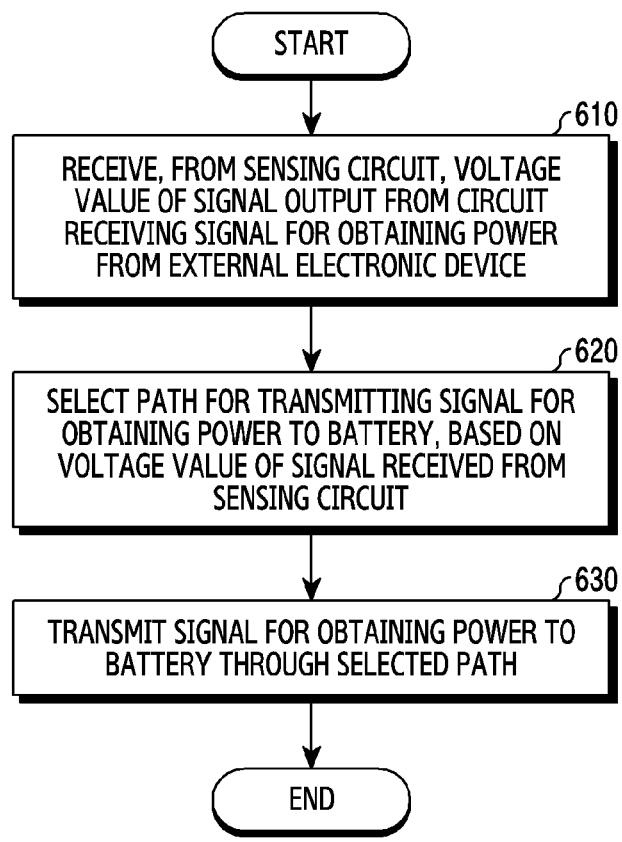
FIG. 6 is a flowchart illustrating an example operation of an electronic device according to various embodiments.

FIG. 6 is a flowchart illustrating an example operation of an electronic device according to various embodiments. This operation may be performed by the electronic device 101 shown in FIG. 1, the electronic device 401 shown in FIG. 4, or the controller 480 of the electronic device 401.

Referring to FIG. 6, the controller 480 may receive, from a sensing circuit, a voltage value of a signal output from a circuit that receives a signal for obtaining power from an external electronic device. In various embodiments, if the signal for obtaining power is received from the external electronic device 402, the circuit receiving the signal may be the coil 410 or the rectifier circuit 423. In various embodiments, if the signal for obtaining power is received from the external electronic device 403, the circuit receiving the signal may be the power interface 430.

In operation 620, the controller 480 may control the electronic device to select a path for transmitting a signal for obtaining power to the battery, based on the voltage value of a signal received from the sensing circuit. In various embodiments, if the signal for obtaining power is received from the external electronic device 402 in operation 610, the controller 480 may compare the voltage value of a signal output from the coil 410 or the rectifier circuit 423 with a configured voltage range, and may select at least one of a first path to a third path according to the comparison result. In various embodiments, if the signal for obtaining power is received from the external electronic device 403 in operation 610, the controller 480 may compare the voltage value of a signal output from the power interface 430 with a configured voltage range, and may select at least one of a fourth path to a sixth path according to the comparison result. In various embodiments, if the signal for obtaining power is received from the external electronic device 402 and the external electronic device 403 in operation 610, the controller 480 may compare the voltage value of a signal output from the coil 410 or the rectifier circuit 423 with a configured voltage range, may compare the voltage value of a signal output from the power interface 430 with a configured voltage range, and may select at least one of a first path to a third path and at least one of a fourth path to a sixth path.

In operation 630, the controller 480 may control the electronic device to transmit a signal for obtaining power to the battery through the selected path. In various embodiments, the controller 480 may control the on/off states of the switches S1 to S6 of the electronic device in order to produce the selected path.

Figure 7:
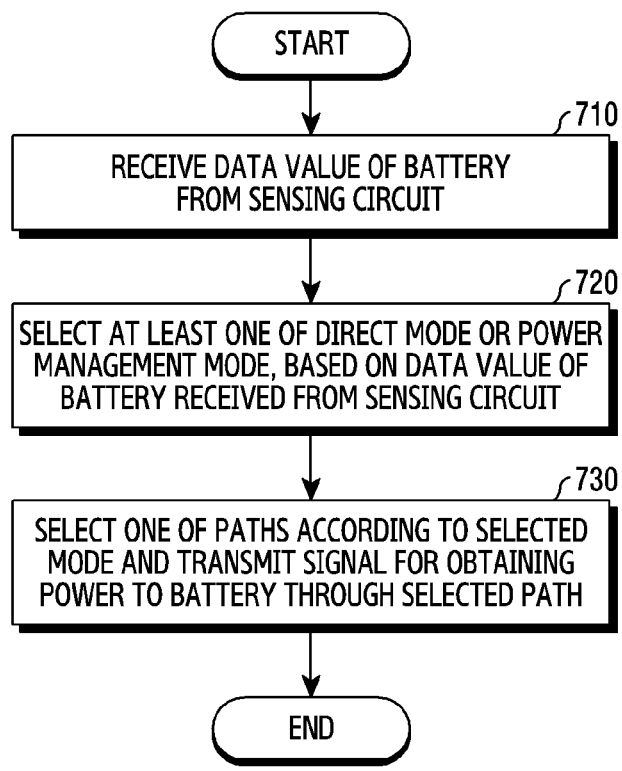
FIG. 7 is a flowchart illustrating an example operation of an electronic device according to various embodiments.

FIG. 7 is a flowchart illustrating an example operation of an electronic device according to various embodiments. This operation may be performed by the electronic device 101 shown in FIG. 1, the electronic device 401 shown in FIG. 4, or the controller 480 of the electronic device 401.

Referring to FIG. 7, the controller 480 may receive a data value of the battery 470 from the sensing circuit in operation 710. The data value may be a value of the temperature, voltage, or current of the battery 470.

In operation 720, the controller 480 may control the electronic device to select at least one of a direct mode and a power management mode, based on the data value of the battery 470 received from the sensing circuit. In various embodiments, the controller 480 may compare a data value corresponding to the voltage state or the battery 470, which is received from the sensing circuit 460, with reference ranges according to the type of data value (e.g., a voltage range according to a pre-charge charging mode, a voltage range according to a trickle-charge charging mode, a voltage range according to constant-current charging mode, a voltage range according to a constant-voltage charging mode, and/or a voltage range according to a re-charge charging mode), and may select at least one of a direct mode or a power management mode. For example, if a data value corresponding to the voltage state of the battery 470 falls within a voltage range according to a pre-charge charging mode and/or a voltage range according to a trickle-charge charging mode, the controller 480 may select a power management mode. As another example, if a data value corresponding to the voltage state of the battery 470 falls within the voltage range according to a constant-current charging mode and/or the voltage range according to a constant-voltage charging mode, the controller 480 may select at least one of a direct mode or a power management mode. As another example, if a data value corresponding to the voltage state of the battery 470 falls within the voltage range according to the re-charge charging mode, the controller 480 may select at least one of a direct mode or a power management mode.

In operation 730, the controller 480 may control the electronic device to select one of the paths according to the selected mode, and may transmit a signal for obtaining power to the battery 470 through the selected path. In various embodiments, the controller 480 may control the on/off states of the switches S1 to S6 in order to produce the selected path.

Figure 8:
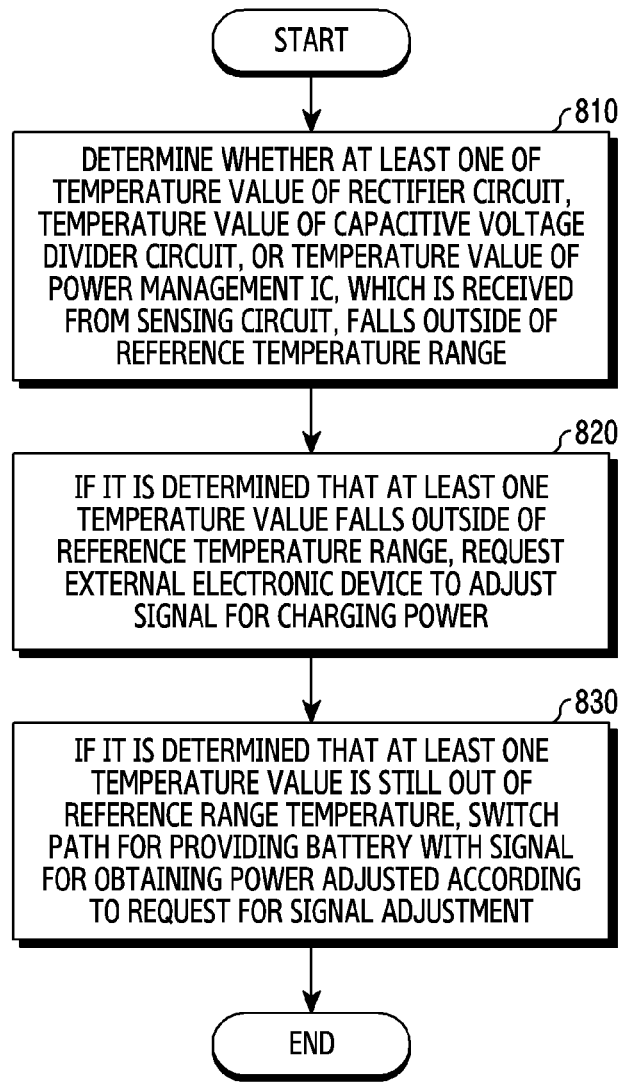
FIG. 8 is a flowchart illustrating an example operation of an electronic device according to various embodiments.

FIG. 8 is a flowchart illustrating an example operation of an electronic device according to various embodiments. This operation may be performed by the electronic device 101 shown in FIG. 1, the electronic device 401 shown in FIG. 4, or the controller 480 of the electronic device 401.

Referring to FIG. 8, in operation 810, the controller 480 may control the electronic device to determine whether at least one of a temperature value of the rectifier circuit 423, a temperature value of the capacitive voltage divider circuit 440, or a temperature value of the power management IC 450 falls outside of a reference temperature range. In various embodiments, the controller 480 may compare a temperature value of the rectifier circuit 423, a temperature value of the capacitive voltage divider circuit 440, or a temperature value of the power management IC 450 with respective reference temperature ranges, thereby determining whether at least one of the temperature value of the rectifier circuit 423, the temperature value of the capacitive voltage divider circuit 440, or the temperature value of the power management IC 450 falls outside of a reference temperature range. In various embodiments, the respective temperature ranges may be set to be different from each other.

In operation 820, if it is determined that the at least one temperature value falls outside of the reference temperature range, the controller 480 may control the electronic device to make a request to an external electronic device for adjustment of a signal for charging power. In various embodiments, the controller 480 may make a request to an external electronic device for reducing a current value of the signal for charging power.

In operation 830, if it is determined that the at least one temperature value is still out of the reference temperature range, the controller 480 may control the electronic device to switch a path through which a signal for obtaining power adjusted according to the request for signal adjustment is provided to the battery 470. In various embodiments, the controller 480 may control the electronic device to switch a path for providing a signal for obtaining power adjusted according to the request for signal adjustment to the battery 470 from a first path to a third path.

As described above, the electronic device 401 according to various embodiments is able to minimize and/or reduce power loss due to adjustment of the voltage and/or the current of an external power signal, which is performed by the power management IC of the electronic device, by adjusting the voltage and current of the external power signal and determining a power supply path such that a power signal having a voltage and current suitable for the battery is supplied to the battery.

Methods according to embodiments stated in claims and/or the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been illustrated and described with reference to various example embodiments thereof, it will be understood by those skilled in the art that various changes in form and details may be made therein without departing from the true spirit and full scope of the disclosure.

What is claimed is:

1. An electronic device comprising:
   a battery;
   a coil configured to receive a signal for wirelessly obtaining power from an external electronic device;
   a rectifier circuit configured to output the signal received by the coil as a DC signal;
   a first capacitive voltage divider circuit configured to adjust the voltage of, and to output, a signal according to a first voltage division ratio;
   a second capacitive voltage divider circuit configured to adjust the voltage of, and to output, a signal according to a second voltage division ratio; and
   a controller operatively connected to the battery, the rectifier circuit, the first capacitive voltage divider circuit, and the second capacitive voltage divider circuit,
   wherein the controller is configured to control the electronic device to: provide the DC signal to at least one capacitive voltage divider circuit among the first capacitive voltage divider circuit and the second capacitive voltage divider circuit, based on a voltage value of the signal received through the coil, and
   wherein the battery is configured to receive another signal output from the at least one capacitive voltage divider circuit, based on the provided DC signal.

2. The electronic device of claim 1, wherein, the DC signal is provided to the first capacitive voltage divider circuit based on the voltage value of the signal received through the coil falling within a reference voltage range.

3. The electronic device of claim 2, further comprising:
   a bypass circuit for the second capacitive voltage divider circuit; and
   a switch connected to the first capacitive voltage divider circuit and configured to selectively connect one of the second capacitive voltage divider circuit and the bypass circuit,
   wherein the rectifier circuit is connected to the switch through the first capacitive voltage divider circuit,
   wherein, the controller is configured to control the electronic device to connect the first capacitive voltage divider circuit to the bypass circuit through the switch such that the battery obtains another signal output from the first capacitive voltage divider circuit based on the output voltage of the rectifier circuit falling within another reference voltage range, and
   wherein, the controller is configured to control the electronic device to connect the first capacitive voltage divider circuit to the second capacitive voltage divider circuit through the switch such that the battery obtains another signal output from the second capacitive voltage divider circuit based on the output voltage of the rectifier circuit falling outside of another reference voltage range.

4. The electronic device of claim 2, further comprising:
   a bypass circuit for the second capacitive voltage divider circuit; and
   a switch connected to the rectifier circuit and configured to selectively connect one of the second capacitive voltage divider circuit and the bypass circuit,
   wherein the first capacitive voltage divider circuit is connected to the second capacitive voltage divider circuit and the bypass circuit,
   wherein, the controller is configured to control the electronic device to connect the rectifier circuit to the bypass circuit through the switch such that the DC signal is provided to the first capacitive voltage divider circuit through the bypass circuit based on the output voltage of the rectifier circuit falling within another reference voltage range, and
   wherein, the controller is configured to control the electronic device to connect the second capacitive voltage divider circuit to the bypass circuit through the switch such that the DC signal is provided to the first capacitive voltage divider circuit through the second capacitive voltage divider circuit based on the output voltage of the rectifier circuit falling outside of another reference voltage range.

5. The electronic device of claim 1, wherein the controller is configured control the electronic device to: provide the DC signal to the first capacitive voltage divider circuit and provide a signal output from the first capacitive voltage divider circuit to the second capacitive voltage divider circuit based on the output voltage of the rectifier circuit falling within another reference voltage range, and wherein the battery is configured to receive another signal output from the second capacitive voltage divider circuit.

6. The electronic device of claim 1, wherein the controller is configured to control the electronic device to:

produce data for configuring a signal for wirelessly obtaining power transmitted by the external electronic device, based on at least one of a battery voltage of the battery and a temperature of the rectifier circuit; and transmit the produced data to the external electronic device.

7. The electronic device of claim 1, wherein the controller is configured to control the electronic device to:

produce data for configuring a signal for wirelessly obtaining power, based on a temperature of the at least one capacitive voltage divider circuit provided with the DC signal; and transmit the produced data to the external electronic device.

8. The electronic device of claim 1, wherein the controller is configured to control the electronic device to provide the DC signal to the other capacitive voltage divider circuit based on a temperature of the at least one capacitive voltage divider circuit provided with the DC signal falling outside of a reference temperature range.

9. An electronic device comprising:

a battery;

a coil configured to transmit and receive a signal for wirelessly obtaining power from and providing power to an external electronic device;

a wireless charging circuit configured to output the signal for wirelessly obtaining power received by the coil from the external electronic device as a DC signal;

a capacitive voltage divider circuit electrically connected to the wireless charging circuit and the battery and configured to adjust the voltage of, and to output, a signal according to a voltage division ratio;

a power management integrated circuit electrically connected to the wireless charging circuit and the battery and configured to adjust the voltage of, and to output, a signal, based on power output information configured in the battery; and a controller operatively connected to the wireless charging circuit, the capacitive voltage divider circuit, and the power management integrated circuit, wherein the controller is configured to control the electronic device to provide the DC signal to at least one circuit of the capacitive voltage divider circuit or the power management integrated circuit (PMIC), based on a voltage value of the signal received through the coil, and wherein the battery is configured to receive another signal output from the at least one circuit, based on the provided DC signal.

10. The electronic device of claim 9, wherein the controller is configured to control the electronic device to provide the DC signal to the capacitive voltage divider circuit based on the voltage value of the signal received through the coil falling within a reference voltage range.

11. The electronic device of claim 9, wherein the controller is configured to control the electronic device to provide the DC signal to the power management integrated circuit (PMIC) based on the voltage value of the signal received through the coil falling within a reference voltage range.

12. The electronic device of claim 9, wherein the controller is configured to control the electronic device to provide the DC signal to the capacitive voltage divider circuit and the power management integrated circuit (PMIC) based on the voltage value of the signal received through the coil falling within a reference voltage range.

13. The electronic device of claim 9, wherein the controller is configured to control the electronic device to:

produce data for configuring a signal for wirelessly obtaining power transmitted by the external electronic device based on a temperature of the circuit provided with the DC signal, among the capacitive voltage divider circuit and the power management integrated circuit (PMIC); and transmit the produced data to the external electronic device.

14. The electronic device of claim 9, wherein the controller is configured to control the electronic device to provide the DC signal to the other circuit that is not provided with the DC signal, among the capacitive voltage divider circuit and the power management integrated circuit (PMIC), based on a temperature of the circuit provided with the DC signal, among the capacitive voltage divider circuit and the power management integrated circuit (PMIC), falling outside of a reference temperature range.

15. The electronic device of claim 9, further comprising a power interface comprising power interface circuitry configured to transmit and receive a signal for obtaining power in a wired manner from another external electronic device and configured to be connected to the capacitive voltage divider circuit and the power management integrated circuit, wherein the controller is configured to control the electronic device to provide a signal for obtaining power in a wired manner from the another external electronic device to the other circuit that is not provided with the DC signal, among the capacitive voltage divider circuit and the power management integrated circuit (PMIC).

16. The electronic device of claim 15, wherein the controller is configured to control the electronic apparatus to:

produce data for configuring a signal for obtaining power in a wired manner, transmitted by the another external electronic device, based on a temperature of the power interface; and transmit the produced data to the another external electronic device.

17. The electronic device of claim 15, wherein the controller is configured to control the electronic device to receive a signal for obtaining power from one external electronic device, among the external electronic device or the another external electronic device, and transmit a signal for obtaining power to a remaining external electronic device.

18. The electronic device of claim 17, wherein the one external electronic device includes the external electronic device, and the remaining external electronic device includes the another external electronic device.

19. The electronic device of claim 17, wherein the one external electronic device includes the another external electronic device, and the remaining external electronic device includes the external electronic device.

20. An electronic device comprising:
a coil configured to receive a wireless power signal from an external electronic device;
a wireless power reception circuit electrically connected to the coil;
a first voltage divider circuit electrically connected to the wireless power reception circuit;
a second voltage divider circuit electrically connected to the first voltage divider circuit and a battery;
a charging circuit configured to supply wireless power input from the wireless power reception circuit to the battery; and
a controller,
wherein the control is configured to control the electronic device to:
receive identification information of the external electronic device;
provide the received wireless power to the battery using at least one of the first voltage divider circuit or the second voltage divider circuit based on the identification information satisfying a specified condition, and compare a voltage rectified by the power reception circuit with a battery voltage, thereby transmitting configuration or response data for the wireless power signal to the external electronic device; and
charge the battery with the received wireless power using the charging circuit based on the identification information not satisfying a specified condition.

* * * * *